United States Patent
Tadi et al.

(10) Patent No.: US 12,031,838 B2
(45) Date of Patent: Jul. 9, 2024

(54) SYSTEM, METHODS, DEVICE AND APPARATUSES FOR PREFORMING SIMULTANEOUS LOCALIZATION AND MAPPING

(71) Applicant: MINDMAZE GROUP SA, Lausanne (CH)

(72) Inventors: Tej Tadi, Lausanne (CH); Julien Pilet, Lausanne (CH); Dat Ngo, Lausanne (CH); Farzin Dadashi, Lausanne (CH); Krzysztof Wrobel, Lausanne (CH); Blazej Czuprynski, Lausanne (CH); Tomasz Trzcinski, Lausanne (CH); Piotr Krzysztof Grodek, Lausanne (CH)

(73) Assignee: MINDMAZE GROUP SA, Lausanne (CH)

( * ) Notice: Subject to any disclaimer, the term of this patent is extended or adjusted under 35 U.S.C. 154(b) by 0 days.

(21) Appl. No.: 18/313,342

(22) Filed: May 7, 2023

(65) Prior Publication Data
US 2024/0085211 A1    Mar. 14, 2024

Related U.S. Application Data

(63) Continuation of application No. 17/397,169, filed on Aug. 9, 2021, now abandoned, which is a (Continued)

(51) Int. Cl.
*G01C 21/00*     (2006.01)
*G01C 21/20*     (2006.01)
(Continued)

(52) U.S. Cl.
CPC ..... *G01C 21/3837* (2020.08); *G01C 21/3848* (2020.08); *G06T 7/248* (2017.01);
(Continued)

(58) Field of Classification Search
CPC ........... G01C 21/3837; G01C 21/3848; G01C 21/206; G06T 7/248; G06T 7/74; G06T 7/80; G06T 2207/30244; H04W 4/029
(Continued)

(56) References Cited

U.S. PATENT DOCUMENTS

| | | | |
|---|---|---|---|
| 6,236,365 B1 * | 5/2001 | LeBlanc ............... | G01S 5/0009 342/450 |
| 7,388,541 B1 * | 6/2008 | Yang .................... | G01C 21/206 342/464 |

(Continued)

FOREIGN PATENT DOCUMENTS

| | | | | |
|---|---|---|---|---|
| CN | 101690271 A | * | 3/2010 | ............. G01S 5/021 |
| CN | 107533801 A | * | 1/2018 | ............. B60K 31/18 |

(Continued)

OTHER PUBLICATIONS

Office Action (Notice of Allowance and Fees Due (PTOL-85)) dated Feb. 7, 2023 for U.S. Appl. No. 17/397,169 (pp. 1-18).

*Primary Examiner* — Mahendra R Patel
(74) *Attorney, Agent, or Firm* — GRAESER ASSOCIATES INTERNATIONAL INC; Dvorah Graeser

(57) ABSTRACT

Embodiments of the present disclosure are directed to various systems, methods and apparatuses for performing simultaneous localization and mapping (SLAM) for a wearable device, including without limitation, a head-mounted wearable device that optionally includes a display screen. Such embodiments enable accurate and quick localization of a wearable device within a dynamically constructed map, optionally through computations performed with a computational device (including those having limited resources). A non-limiting example of such a computational device is a smart cellular phone or other mobile computational device.

15 Claims, 33 Drawing Sheets

Related U.S. Application Data continuation of application No. 16/513,952, filed on Jul. 17, 2019, now abandoned, which is a continuation-in-part of application No. PCT/IB2018/000281, filed on Jan. 18, 2018.

(60) Provisional application No. 62/699,836, filed on Jul. 18, 2018, provisional application No. 62/577,751, filed on Oct. 27, 2017, provisional application No. 62/448,370, filed on Jan. 19, 2017.

(51) Int. Cl.
| | | |
|---|---|---|
| *G06T 7/246* | (2017.01) | |
| *G06T 7/73* | (2017.01) | |
| *G06T 7/80* | (2017.01) | |
| *H04W 4/029* | (2018.01) | |

(52) U.S. Cl.
CPC .............. *G06T 7/74* (2017.01); *G06T 7/80* (2017.01); *H04W 4/029* (2018.02); *G01C 21/206* (2013.01); *G06T 2207/30244* (2013.01)

(58) Field of Classification Search
USPC .................................................... 382/103
See application file for complete search history.

(56) References Cited

U.S. PATENT DOCUMENTS

| | | | | |
|---|---|---|---|---|
| 7,720,572 B2* | 5/2010 | Ziegler | ............... | G05D 1/0274 |
| | | | | 713/153 |
| 8,611,920 B2* | 12/2013 | Lau | ................. | G06Q 10/10 |
| | | | | 455/456.2 |
| 9,033,797 B1 | 5/2015 | Karpiuk | | |
| 9,326,103 B2* | 4/2016 | Shen | ............... | H04W 4/025 |
| 9,366,540 B2* | 6/2016 | Chien | ............... | G01C 21/26 |
| 9,482,741 B1* | 11/2016 | Min | ............... | G01S 5/0242 |
| 9,898,866 B2 | 2/2018 | Fuchs | | |
| 9,967,701 B1* | 5/2018 | Barfield, Jr. | ............ | G01C 21/20 |
| 2011/0102800 A1 | 5/2011 | Bita | | |
| 2011/0145739 A1* | 6/2011 | Berger | ............... | G06F 40/174 |
| | | | | 715/763 |
| 2011/0206236 A1* | 8/2011 | Center, Jr. | ............ | G06T 7/593 |
| | | | | 382/103 |
| 2012/0185094 A1* | 7/2012 | Rosenstein | ............ | H04N 13/271 |
| | | | | 901/1 |
| 2012/0190380 A1* | 7/2012 | Dupray | ................. | G01S 5/0278 |
| | | | | 455/456.1 |
| 2012/0290311 A1* | 11/2012 | Tara | ........................ | G16H 40/20 |
| | | | | 705/2 |
| 2013/0332064 A1* | 12/2013 | Funk | .................. | G01C 21/1652 |
| | | | | 701/409 |
| 2014/0126769 A1* | 5/2014 | Reitmayr | ................... | G06T 7/12 |
| | | | | 382/103 |
| 2014/0195149 A1* | 7/2014 | Yang | ..................... | H04W 64/00 |
| | | | | 701/445 |
| 2014/0350839 A1* | 11/2014 | Pack | ...................... | G05D 1/0231 |
| | | | | 901/1 |
| 2014/0379256 A1* | 12/2014 | Stipes | ................ | G01C 21/1656 |
| | | | | 701/501 |
| 2015/0224640 A1 | 8/2015 | Vu | | |
| 2015/0262208 A1 | 9/2015 | Bjontegard | | |
| 2016/0100790 A1 | 4/2016 | Cantu | | |
| 2016/0124608 A1 | 5/2016 | Sumner | | |
| 2016/0147230 A1* | 5/2016 | Munich | .................... | B25J 5/007 |
| | | | | 701/28 |
| 2016/0263477 A1 | 9/2016 | Ladd | | |
| 2016/0317122 A1 | 11/2016 | Dos Santos Mendonca | | |
| 2016/0350906 A1* | 12/2016 | Meier | ...................... | G06T 7/251 |
| 2017/0053450 A1* | 2/2017 | Rodriguez | ............. | G09G 3/003 |
| 2017/0336203 A1 | 11/2017 | Barnes | | |
| 2018/0109921 A1* | 4/2018 | Cerchio | .................... | H04W 4/80 |
| 2018/0296080 A1* | 10/2018 | Glinec | ...................... | A61B 1/24 |
| 2019/0384318 A1* | 12/2019 | Fuchs | ...................... | G01S 13/86 |

FOREIGN PATENT DOCUMENTS

| | | | | | |
|---|---|---|---|---|---|
| CN | | 104248395 B | * | 6/2018 | ............... A47L 11/00 |
| CN | | 108700876 A | * | 10/2018 | ............... B60L 3/0015 |
| CN | | 109923488 A | * | 6/2019 | ............ B64C 39/024 |
| CN | | 109923488 A | | 6/2019 | |
| CN | | 110501011 A | * | 11/2019 | ............. G01C 21/12 |
| WO | WO-2010001940 A1 | | * | 1/2010 | ............. G01C 11/06 |
| WO | WO-2015090420 A1 | | * | 6/2015 | ............. G06T 17/10 |
| WO | WO-2017041303 A1 | | * | 3/2017 | ........... B64C 39/024 |
| WO | | 2018134686 A2 | | 7/2018 | |
| WO | WO-2018134686 A2 | | * | 7/2018 | ........... G01C 21/005 |
| WO | | 2018218149 A1 | | 11/2018 | |
| WO | WO-2018218149 A1 | | * | 11/2018 | ............. G01C 21/32 |
| WO | | 2019018315 A1 | | 1/2019 | |
| WO | WO-2019018315 A1 | | * | 1/2019 | ........... G01C 21/165 |

* cited by examiner

Figure 12D – detailed parallax
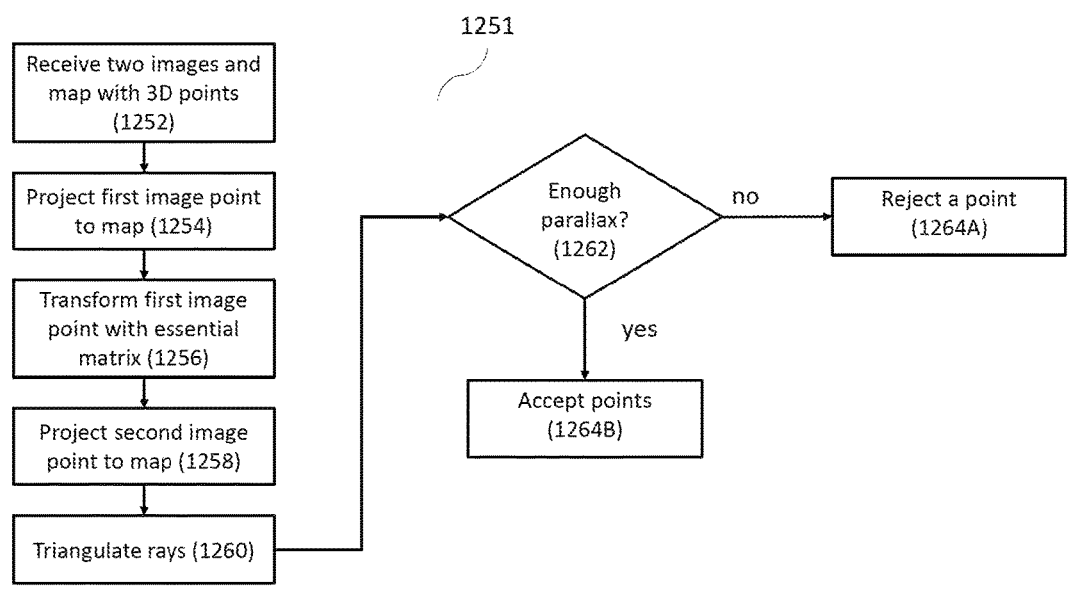

Receive tracked trajectories of features, initial geometry and IMU data points (1552)

↓

Initialize spline control points (1554)

↓

Evaluate the objective function (1556) ←┐

↓                                        │ Minimize
                                         │ error
Refine control points and map points (1558) ─┘

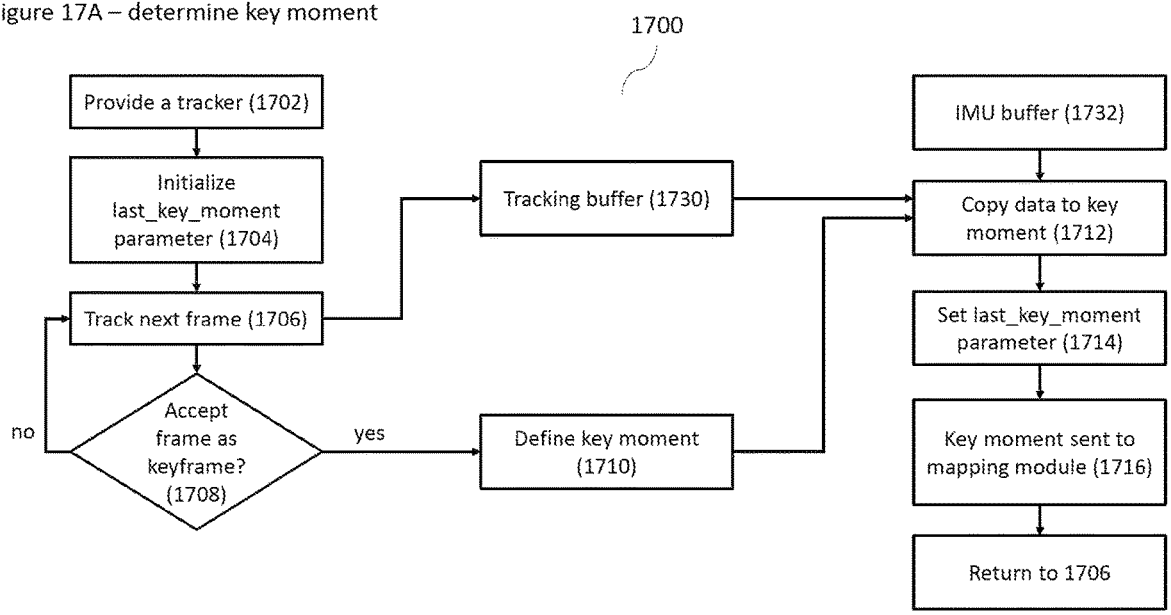
Figure 17A – determine key moment

SYSTEM, METHODS, DEVICE AND APPARATUSES FOR PREFORMING SIMULTANEOUS LOCALIZATION AND MAPPING

FIELD OF THE DISCLOSURE

The present disclosure, in at least some embodiments, is directed to systems, methods, and apparatuses for performing simultaneous localization and mapping (SLAM), and in particular, for such systems, methods, and apparatuses, for performing SLAM with/for a wearable device.

BACKGROUND

The term SLAM refers to "Simultaneous Localization And Mapping," and was initially applied to problems of independent movement of a mobile robot (device). In some such systems, the location of the mobile device (e.g., robot) is necessary—that is, its location on a map of an environment—as is a map the environment, so that the mobile device can determine its relative location within that environment. In some known systems, however, these tasks cannot be performed simultaneously, which results in substantial delays when processing mobile device location information.

SLAM can be performed with sensor data from a number of different sensor types. Visual SLAM refers to the use of visual data from a visual sensor, such as for example a camera, to perform the SLAM process. In some cases, only such visual data is used for the SLAM process (see for example Visual Simultaneous Localization and Mapping: A Survey, Artificial Intelligence Review 43(1) November 2015).

Various types of sensors and the use of their data in the SLAM process are described in "Past, Present, and Future of Simultaneous Localization And Mapping: Towards the Robust-Perception Age", Cadena et al, https://arxiv.org/pdf/1606.05830.pdf. This article also describes the importance of the "pose", or position and orientation, for the SLAM process. The pose relates to the position and orientation of the robot or other entity to which the sensor is attached, while the map describes the environment for that robot.

Additionally, some known systems cannot dynamically determine the nature of the mobile device's environment, and therefore, cannot dynamically determine navigation instructions, and/or other information. For example, in some known systems, a navigator for the mobile device can input pre-determined environment data into the known system so as to provide a description of the environment. Such known systems, however, cannot modify the description of the environment substantially in real-time, based on new environmental information, and/or the like.

U.S. Pat. No. 9,367,811 describes a method for context aware localization, mapping, and tracking (CALMT). However this method does not feature simultaneous localization and mapping, such that it is less useful than SLAM. Furthermore the method is focused on computer vision, which is a more limited activity.

US Patent Application No. 2014/0125700 describes one method for performing SLAM with sensor data, but is restricted to use in situations that have geometric constraints that are known a priori, which must be provided to the SLAM system before it can begin operation.

U.S. Pat. No. 9,674,507 describes a monocular SLAM system that creates a 3D map with panoramic and 6DOF camera movements. The system is limited to generating maps only by creating keyframes first, analyzing features, and then potentially saving the keyframe as part of the map. The system requires that all tasks operate in a single process or provides the possibility that all mapping tasks can be separated into another process with all mapping tasks in that single process. The system does not provide further flexibility given that mapping is done by keyframes only.

U.S. Pat. No. 9,390,344 describes a SLAM system using various motion sensors and that maps and tracks simultaneously using threaded processes. The system described similarly uses keyframes only to create maps.

Thus, a need exists for methods, apparatuses, and systems that can dynamically determine the location of a mobile device, dynamically determine the nature of the mobile device's environment, and can efficiently determine actions for the mobile device to take based on the dynamically-determined information. Methods and systems for mapping operations without any a priori constraints are also needed.

SUMMARY OF SOME OF THE EMBODIMENTS

Embodiments of the present disclosure include, systems, methods and apparatuses for performing simultaneous localization and mapping (SLAM) which addressed the above-noted shortcomings.

In some embodiments, a SLAM system is provided for a wearable device, including without limitation, a head-mounted wearable device that optionally includes a display screen. Such systems, methods and apparatuses can be configured to accurately (and in some embodiments, quickly) localize a wearable device within a dynamically constructed map, e.g., through computations performed with a computational device. A non-limiting example of such a computational device is a smart cellular phone or other mobile computational device.

According to at least some embodiments, SLAM systems, methods and apparatuses can support a VR (virtual reality) application, an AR (augmented reality) application, and/or the like.

According to at least some embodiments, there is provided a wearable apparatus, comprising: a monocular optical sensor, a computational device, and a simultaneous localization and mapping (SLAM) analyzer operational on the computational device and configured for receiving optical sensor data from said sensor, the SLAM analyzer comprising: a localization module, and a fast mapping module configured to rapidly create said dynamically constructed a map from said sensor data; and a map refinement module to refine said dynamically constructed map according to said sensor data; wherein said SLAM analyzer is configured to localize the sensor according to said optical sensor data within a dynamically constructed map according to a SLAM process; each of said localization module, said fast mapping module and said map refinement module is configured to operate at a separate process speed of said computational device; and said localization module localizes said sensor in said dynamically constructed map according to said sensor data.

Optionally said computational device comprises a mobile computational device.

Optionally said computational device comprises a cellular phone.

Optionally the apparatus further comprises headgear for mounting said apparatus to a user, wherein said cellular phone comprises said sensor, and said cellular phone is mounted on said headgear.

Optionally said computational device comprises a hardware processor configured to perform a predefined set of basic operations in response to receiving a corresponding basic instruction selected from a predefined native instruction set of codes, and memory; said SLAM analyzer comprises: a first set of machine codes selected from the native instruction set for receiving said optical sensor data, a second set of machine codes selected from the native instruction set for operating said localization module, a third set of machine codes selected from the native instruction set for operating said fast mapping module, and a fourth set of machine codes selected from the native instruction set for operating said map refinement module; and each of the first, second, third and fourth sets of machine code is stored in the memory.

Optionally said hardware processor operates said map refinement module at a process speed that is at least 50% slower than said fast mapping module.

Optionally said localization module comprises a tracking processor, said tracking processor operates at a separate process speed from each of a fast mapping processor and a map refinement processor; said process speed of said tracking processor is at least five times faster than said process speed of said fast mapping processor; and said tracking processor locates said sensor according to said sensor data and according to a last known position of said sensor on said map.

Optionally said tracking processor reduces jitter by spreading error across localizations.

Optionally said map refinement processor is configured to calibrate said sensor according to a difference estimate between said map before and after said map refinement processor refines said map.

Optionally said map refinement processor is configured to correct for drift caused by said fast mapping processor.

Optionally said map refinement processor is configured to perform map refinement by bundle adjustment.

Optionally the apparatus further comprises a sensor preprocessor operated by said computational device, said sensor comprises a camera, said data comprises video data, and said sensor preprocessor further comprises a calibration module for calibrating said video data of said camera according to a calibration process.

Optionally said calibration process includes at least one of determining lens distortion and focal length.

Optionally said calibration module is configured to calibrate said camera according to a model of said camera and/or of said cellular phone.

Optionally said sensor preprocessor comprises a sensor abstraction interface for abstracting data from said sensor.

Optionally said sensor comprises a camera, said data comprises video data, said localization module is configured to reduce jitter while determining a location a plurality of times according to at least one of maintaining a constant error, mixing frame-to-frame with keyframe-to-frame tracking, applying a Kalman filter, and a combination thereof.

Optionally said sensor comprises a camera, said data comprises video data, the apparatus further comprising a sensor preprocessor operated by said computational device, and said sensor preprocessor further comprises a sensor data preprocessor configured for converting said video data to grayscale if necessary and then applying a Gaussian pyramid to said grayscale video data.

Optionally said SLAM analyzer is configured to localize the sensor only according to said optical sensor data.

Optionally said optical sensor data comprises video data and wherein said SLAM analyzer is configured to perform an initialization process comprising: a keypoints reference frame detection process configured to select an image as a reference frame; a keypoints detection process configured for detecting a plurality of keypoints on the reference frame; and an initial map creation process configured for creating an initial map from said keypoints.

Optionally said keypoints detection process comprises a LK (Lucas-Kanade) process.

Optionally said initialization process further comprises a verification process configured to verify validity of the tracked points.

Optionally said verification process comprises a NCC (Normalized Cross Correlation) process.

Optionally said initialization process further comprises a pose calculation process configured to calculate a pose of said optical sensor before said initial map creation process creates said initial map.

Optionally said pose calculation process comprises applying homography and/or an essential matrix to said keypoints to determine the pose.

Optionally said pose calculation process comprises applying said homography and said essential matrix, and determining which of said applying provides a more accurate result.

Optionally said pose calculation process comprises applying said homography first to determine if a sufficiently accurate result is obtained; if said sufficiently accurate result is not obtained, applying said essential matrix.

Optionally said pose calculation process comprises a RANSAC process.

Optionally said pose calculation process further comprises estimating said essential matrix according to a process selected from the group consisting of GOODSAC and RANSAC.

Optionally said map is generated without a priori constraint.

Optionally said map is generated de novo.

Optionally the apparatus further comprises at least one of an accelerometer, a gyroscope, a magnetometer, a barometric pressure sensor, a GPS (global positioning system) sensor, a microphone or other audio sensor, a proximity sensor, a temperature sensor, a UV (ultraviolet light) sensor, a depth sensor, and an IMU (inertial measurement unit).

Optionally said IMU comprises an accelerometer and a gyroscope.

Optionally said IMU further comprises a magnetometer.

Optionally during an initialization of said SLAM analyzer, said optical sensor data and said IMU data are interpolated according to a time based interpolation method, followed by initial bundle adjustment of interpolated data.

Optionally said SLAM analyzer is additionally configured to determine displacement of at least said optical sensor according to a combination of translation of said optical sensor and rotation of said IMU.

Optionally said SLAM analyzer is additionally configured to integrate rotation of said IMU of a first pose to determine a second pose of said optical sensor.

Optionally said SLAM analyzer is further configured to operate a loop closure process, and update said map according to said second pose, followed by performing said loop closure process.

Optionally said optical sensor comprises a camera selected from the group consisting of RGB camera, color camera, grayscale camera, infrared camera, a charged coupled device (CCD), and a CMOS sensor.

Optionally said SLAM analyzer is additionally configured to perform a SLAM process comprising: selecting a plurality of keyframes of said video data; determining a plurality of features of each of said keyframes; warping a plurality of patches of said keyframes around said plurality of features; performing a NCC (normalized cross-correlation) process on said warped keyframe patches; and determining a location of said optical sensor according to said NCC process.

Optionally said SLAM process further comprises determining a displacement estimate from a previous known location of said optical sensor, and said determining said location of said optical sensor according to said NCC process comprises applying a result of said NCC process to said displacement estimate.

Optionally said selecting said plurality of keyframes of said video data further comprises selecting a plurality of keyframes from said dynamically constructed map according to a plurality of feature points on said dynamically constructed map.

Optionally said SLAM process further comprises reducing jitter by maintaining a consistent error across analysis of a plurality of frames.

Optionally said SLAM process further comprises: determining if relocalization of said optical sensor is required according to a determination of reliability of said location of said optical sensor, and if so, performing relocalization by comparing a plurality of features of said keyframes to determine said previous known location of said optical sensor, performing said selecting a plurality of keyframes of said video data; determining a plurality of features of each of said keyframes; warping a plurality of patches of said keyframes around said plurality of features; performing a NCC (normalized cross-correlation) process on said warped keyframe patches; and determining a location of said optical sensor according to said NCC process.

Optionally said comparing said plurality of features of said keyframes comprises: determining a descriptor for each feature; sorting said descriptors for similarity; sorting said keyframes according to similar descriptors; and comparing said sorted descriptors to a plurality of known landmarks on said dynamically constructed map appearing on said sorted keyframes.

Optionally said sorting said descriptors for similarity is performed with a vocabulary tree.

Optionally said comparing said sorted descriptors to a plurality of known landmarks on said dynamically constructed map appearing on said sorted keyframes further comprises removing outliers and determining said previous known location.

Optionally said removing outliers and determining said previous known location is performed according to RANSAC.

Optionally said determining said location comprises: searching for a known landmark on a plurality of selected keyframes; if said known landmark is not found on said plurality of selected keyframes, determining said known landmark to be invalid; and if said known landmark is found on at least one of said plurality of selected keyframes, determining said known landmark to be validated.

Optionally said SLAM analyzer further comprises a map collaboration processor configured for communicating map information to and receiving map information from at least one additional SLAM analyzer external to the apparatus.

Optionally said SLAM analyzer further comprises a map changes processor, and said map changes processor is configured to detect a change in the environment represented by said map.

Optionally the apparatus further comprises an object application, which may also be termed herein an outside application, operated by said computational device and configured for manipulating, locating or representing an object, wherein said map changes processor is configured to inform said object application that: a particular object has been moved, a particular object has disappeared from its last known location, or a new specific object has appeared. The object as described herein is a physical object in the physical world, but mapped onto the map as described herein.

Optionally said object application comprises a VR (virtual reality) application or an AR (augmented reality) application.

Optionally said object application is an AR application, said SLAM analyzer further comprising a real object locator, said real object locator is configured to determine a location and geometry of a physical object in an environment external to the apparatus, and provides said location and geometry to said AR application.

Optionally the apparatus further comprises a housing for housing said optical sensor.

Optionally said housing further houses said computational device.

Optionally said computational device is located separately from said housing.

Optionally said computational device is located remotely from said housing.

According to at least some embodiments, there is provided a wearable apparatus, comprising: a sensor; a computational device; and a simultaneous localization and mapping (SLAM) analyzer configured for receiving data from said sensor and for being operated by said computational device, wherein: said SLAM analyzer is configured to localize the apparatus according to said sensor data within a dynamically constructed map according to a SLAM process; said sensor comprises a camera, said data comprises video data from said camera, said SLAM process comprises: selecting a plurality of keyframes of said video data; determining a plurality of features of each of said keyframes; warping a plurality of patches of said keyframes around said plurality of features; performing a NCC (normalized cross-correlation) process on said warped keyframe patches; and determining a location of said wearable device according to said NCC process.

Optionally said SLAM process further comprises determining a displacement estimate from a previous known location of said wearable device, and said determining said location of said wearable device according to said NCC process comprises applying a result of said NCC process to said displacement estimate.

Optionally said selecting said plurality of keyframes of said video data further comprises selecting a plurality of keyframes from said dynamically constructed map according to a plurality of feature points on said dynamically constructed map.

Optionally said SLAM process further comprises reducing jitter by maintaining a consistent error across analysis of a plurality of frames.

Optionally said SLAM process further comprises: determining if relocalization of said wearable device is required according to a determination of reliability of said location of said wearable device, and if so, performing relocalization by comparing a plurality of features of said keyframes to determine said previous known location of said wearable device, performing said selecting a plurality of keyframes of said video data; determining a plurality of features of each of said keyframes; warping a plurality of patches of said keyframes around said plurality of features; performing a NCC (normalized cross-correlation) process on said warped keyframe patches; and determining a location of said wearable device according to said NCC process.

Optionally said comparing said plurality of features of said keyframes comprises: determining a descriptor for each feature; sorting said descriptors for similarity; sorting said keyframes according to similar descriptors; and comparing said sorted descriptors to a plurality of known landmarks on said dynamically constructed map appearing on said sorted keyframes.

Optionally said sorting said descriptors for similarity is performed with a vocabulary tree.

Optionally said comparing said sorted descriptors to a plurality of known landmarks on said dynamically constructed map appearing on said sorted keyframes further comprises removing outliers and determining said previous known location.

Optionally said removing outliers and determining said previous known location is performed according to RANSAC.

Optionally said determining said location comprises: searching for a known landmark on a plurality of selected keyframes; if said known landmark is not found on said plurality of selected keyframes, determining said known landmark to be invalid; and if said known landmark is found on at least one of said plurality of selected keyframes, determining said known landmark to be validated.

Optionally the apparatus further comprises an AR (augmented reality) application, wherein: said SLAM analyzer further comprises an obstacle avoidance processor; said obstacle avoidance processor is configured to determine a location and geometry of each validated landmark that is a potential obstacle and communicates said location and geometry to said AR application.

Optionally the apparatus further comprises an VR (virtual reality) application, wherein said SLAM analyzer further comprises an obstacle avoidance processor configured to determine a location and geometry of each validated landmark that is a potential obstacle and communicates said location and geometry to said VR application.

Optionally said sensor comprises a plurality of cameras and wherein said video data is analyzed at least as stereo image data.

Optionally the apparatus further comprises an IMU, wherein said SLAM analyzer is further configured to analyze said IMU data for said SLAM process.

Optionally said SLAM analyzer is further configured to interpolate said optical data and said IMU data by said SLAM process.

Optionally said SLAM process is configured to interpolate said optical sensor data and said IMU data, and calculate a quaternion interpolation of said optical sensor data and said IMU data.

Optionally said SLAM process further comprises determining an initialization error for said IMU, and for weighting said quaternion interpolation according to said initialization error.

Optionally said quaternion interpolation comprises a weighted SLERP interpolation.

Optionally said IMU comprises a magnetometer, said apparatus further comprises a magnetometer separate from said IMU or a combination thereof, and wherein said SLAM process further comprises determining translation of said magnetometer according to magnetometer data, and applying said translation to said interpolated optical sensor data and IMU data.

According to some embodiments there is provided a SLAM apparatus configured for performing simultaneous localization and mapping (SLAM) process, comprising: a computational device, a SLAM analyzer operated by or operational on said computational device, an optical sensor in communication with said computational device, an IMU in communication with said computational device, wherein said IMU comprises an accelerometer and a gyroscope; and a structure for causing said optical sensor and said IMU to move in tandem; wherein: said computational device is configured to receive sensor data from said optical sensor and from said IMU for being analyzed by said SLAM analyzer; and said SLAM analyzer is configured to perform a SLAM process to create a map and to localize one or both of said optical sensor and said IMU in said map according to said optical sensor data and said IMU data, according to a time based localization method.

Optionally said structure comprises a housing for housing said optical sensor and said IMU.

Optionally said housing further houses said computational device.

Optionally said SLAM process further comprises performing initial bundle adjustment according to a spline, wherein said spline is determined according to said optical sensor data and said IMU data, and wherein a second derivative of said spline is determined according to accelerometer data.

Optionally said IMU comprises a magnetometer, said apparatus further comprises a magnetometer separate from said IMU or a combination thereof, and wherein said SLAM process further comprises determining translation of said magnetometer according to magnetometer data; wherein said SLAM process further comprises applying said translation to said interpolated optical sensor data and IMU data.

According to at least some embodiments, there is provided a SLAM method configured for performing SLAM for a wearable apparatus comprising a sensor, a computational device, and a simultaneous localization and mapping (SLAM) analyzer operated by the computational device, the method comprising: receiving sensor data from said sensor by said SLAM analyzer; performing a SLAM process by said SLAM analyzer, said SLAM process comprising: simultaneously dynamically constructing a map and locating the apparatus according to said sensor data within said dynamically constructed map, wherein said SLAM process is adapted to be performed by said limited resources of said computational device; wherein: said performing said SLAM process comprises: performing a fast mapping process to rapidly create said dynamically constructed map from said sensor data; performing a localization process to localize said wearable device in said dynamically constructed map according to said sensor data; and performing a map refinement process to refine said dynamically constructed map according to said sensor data, each of said fast mapping process and said map refinement process is operated at a separate process speed of said computational device, and said map refinement process operates at a process speed that is at least 50% slower than a process speed of said fast mapping process so as to adapt said SLAM process to be performed by said computational device.

According to at least some embodiments, there is provided a SLAM method for performing SLAM for a wearable apparatus comprising a sensor and a computational device, wherein said sensor comprises a camera providing video data; the method comprising: receiving video data from said camera by said computational device; simultaneously dynamically constructing a map and locating the apparatus according to said video data within said dynamically constructed map, by selecting a plurality of keyframes of said video data; determining a plurality of features of each of said keyframes; warping a plurality of patches of said keyframes around said plurality of features; performing NCC (normalized cross-correlation) process on said warped keyframe patches; and determining a location of said wearable device on said dynamically constructed map according to said NCC process.

Optionally the method further comprises adding IMU data for a more efficient and/or accurate SLAM process.

Unless otherwise defined, all technical and scientific terms used herein have the same meaning as commonly understood by one of ordinary skill in the art to which this disclosure belongs. The materials, methods, and examples provided herein are illustrative only and not intended to be limiting.

Various embodiments of the methods, systems and apparatuses of the present disclosure can be implemented by hardware and/or by software or a combination thereof. For example, as hardware, selected steps of methodology according to some embodiments can be implemented as a chip and/or a circuit. As software, selected steps of the methodology (e.g., according to some embodiments of the disclosure) can be implemented as a plurality of software instructions being executed by a computer (e.g., using any suitable operating system). Accordingly, in some embodiments, selected steps of methods, systems and/or apparatuses of the present disclosure can be performed by a processor (e.g., executing an application and/or a plurality of instructions).

Although embodiments of the present disclosure are described with regard to a "computer", and/or with respect to a "computer network," it should be noted that optionally any device featuring a processor and the ability to execute one or more instructions is within the scope of the disclosure, such as may be referred to herein as simply a computer or a computational device and which includes (but not limited to) any type of personal computer (PC), a server, a cellular telephone, an IP telephone, a smartphone, a PDA (personal digital assistant), a thin client, a mobile communication device, a smartwatch, head mounted display or other wearable that is able to communicate wired or wirelessly with a local or remote device. To this end, any two or more of such devices in communication with each other may comprise a "computer network."

BRIEF DESCRIPTION OF THE DRAWINGS

Embodiments of the disclosure is herein described, by way of example only, with reference to the accompanying drawings. With specific reference now to the drawings in detail, it is stressed that particulars shown are by way of example and for purposes of illustrative discussion of the various embodiments of the present disclosure only, and are presented in order to provide what is believed to be a useful and readily understood description of the principles and conceptual aspects of the various embodiments of inventions disclosed therein.

FIGS. 12A-12D show a detailed, exemplary, non-limiting flow diagram for performing SLAM according to at least some embodiments;

FIG. 15B shows an exemplary, non-limiting flow diagram for initial bundle adjustment with IMU data according to at least some embodiments;

FIG. 17A shows an exemplary, non-limiting flow diagram for determining a key moment according to at least some embodiments.

DETAILED DESCRIPTION OF SOME OF THE EMBODIMENTS

Figure 1A:
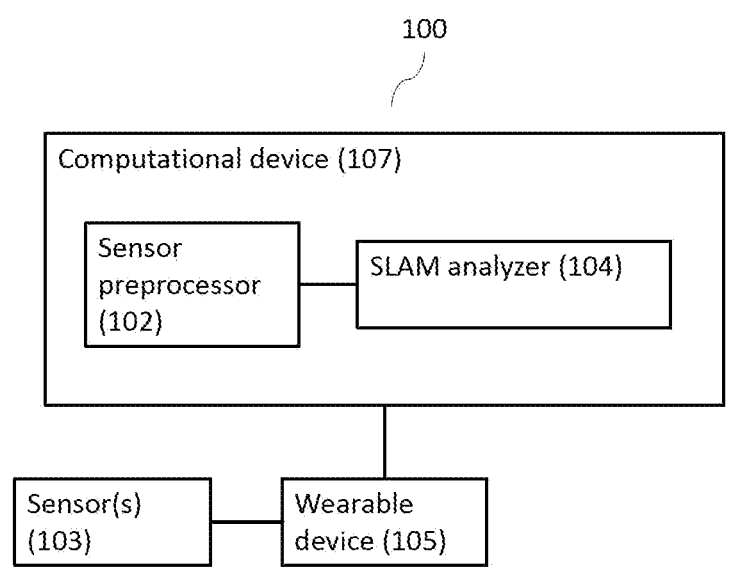
FIG. 1A shows schematic of a non-limiting example of a SLAM system, according to at least some embodiments.

FIG. 1A shows a schematic of a non-limiting example of a simultaneous localization and mapping (SLAM) system, according to at least some embodiments of the present disclosure. In some implementations, SLAM system 100 can include at least one computational device/computer 107 (as indicated earlier, the terms/phrases of computer, processor and computation device can be used interchangeably in the present disclosure), a wearable device 105, and one or more sensors 103. The computational device 107 can include a sensor preprocessor 102 and a SLAM analyzer 104, and can be operatively coupled to the wearable device 105 (e.g., wired or wirelessly), and can be included in the wearable device 105, and/or some combination thereof. Sensor preprocessor 102 and SLAM analyzer 104 can be separate processors in and of themselves in the computational device, or, may be software modules (e.g., an application program and/or a set of computer instructions for performing SLAM functionality operational on one or more processors). In some implementations, the computational device 107 can be configured to receive signal data (e.g., from the wearable device 105), to preprocess the signal data, so as to determine movement of the wearable device, and to instruct the wearable device to perform one or more actions based on the movement of the wearable device. Specifically, in some implementations, sensor preprocessor 102 can receive the sensor data from the wearable device 105, and can perform preprocessing on the sensor data. For example, sensor preprocessor 102 can generate abstracted sensor data based on the sensor data.

SLAM analyzer 104 is configured to operate a SLAM process so as to determine a location of wearable device 105 within a computational device-generated map, as well as being configured to determine a map of the environment surrounding wearable device 105. For example, the SLAM process can be used to translate movement of the user's head and/or body when wearing the wearable device (e.g., on the user's head or body). A wearable that is worn on the user's head would for example provide movement information with regard to turning the head from side to side, or up and down, and/or moving the body in a variety of different ways. Such movement information is needed for SLAM to be performed.

In some implementations, because the preprocessed sensor data is abstracted from the specific sensors, the SLAM analyzer 104, therefore, can be sensor-agnostic, and can perform various actions without knowledge of the particular sensors from which the sensor data was derived.

As a non-limiting example, if sensor 103 is a camera (e.g., digital camera including a resolution, for example, of 640× 480 and greater, at any frame rate including, for example 60 fps), then movement information may be determined by SLAM analyzer 104 according to a plurality of images from the camera. For such an example, sensor preprocessor 102 preprocesses the images before SLAM analyzer 104 performed the analysis (which may include, for example, converting images to grayscale). Next a Gaussian pyramid may be computed for one or more images, which is also known as a MIPMAP (multum in parvo map), in which the pyramid starts with a full resolution image, and the image is operated on multiple times, such that each time, the image is half the size and half the resolution of the previous operation. SLAM analyzer 104 may perform a wide variety of different variations on the SLAM process, including one or more of, but not limited to, PTAM (Parallel Tracking and Mapping), as described for example in "Parallel Tracking and Mapping on a Camera Phone" by Klein and Murray, 2009 (available from ieeexplore.ieee.org/document/5336495/); DSO (Direct Sparse Odometry), as described for example in "Direct Sparse Odometry" by Engel et al, 2016 (available from https://arxiv.org/abs/1607.02565); or any other suitable SLAM method, including those as described herein.

In some implementations, the wearable device 105 can be operatively coupled to the one or more sensor(s) 103 and the computational device 107 (e.g., wired, wirelessly). The wearable device 105 can be a device (such as an augmented reality (AR) and/or virtual reality (VR) headset, and/or the like) configured to receive sensor data, so as to track a user's movement when the user is wearing the wearable device 105. The wearable device 105 can be configured to send sensor data from the one or more sensors 103 to the computational device 107, such that the computational device 107 can process the sensor data to identify and/or contextualize the detected user movement.

In some implementations, the one or more sensors 103 can be included in wearable device 105 and/or separate from wearable device 105. A sensor 105 can be one of a camera (as indicated above), an accelerometer, a gyroscope, a magnetometer, a barometric pressure sensor, a GPS (global positioning system) sensor, a microphone or other audio sensor, a proximity sensor, a temperature sensor, a UV (ultraviolet light) sensor, an IMU (inertial measurement unit), and/or other sensors. If implemented as a camera, sensor 103 can be one of an RGB, color, grayscale or infrared camera, a charged coupled device (CCD), a CMOS sensor, a depth sensor, and/or the like. If implemented as an IMU, sensor 103 can be an accelerometer, a gyroscope, a magnetometer, a combination of two or more of same, and/or the like. When multiple sensors 103 are operatively coupled to and/or included in the wearable device 105, the sensors 103 can include one or more of the aforementioned types of sensors.

Figure 1B:
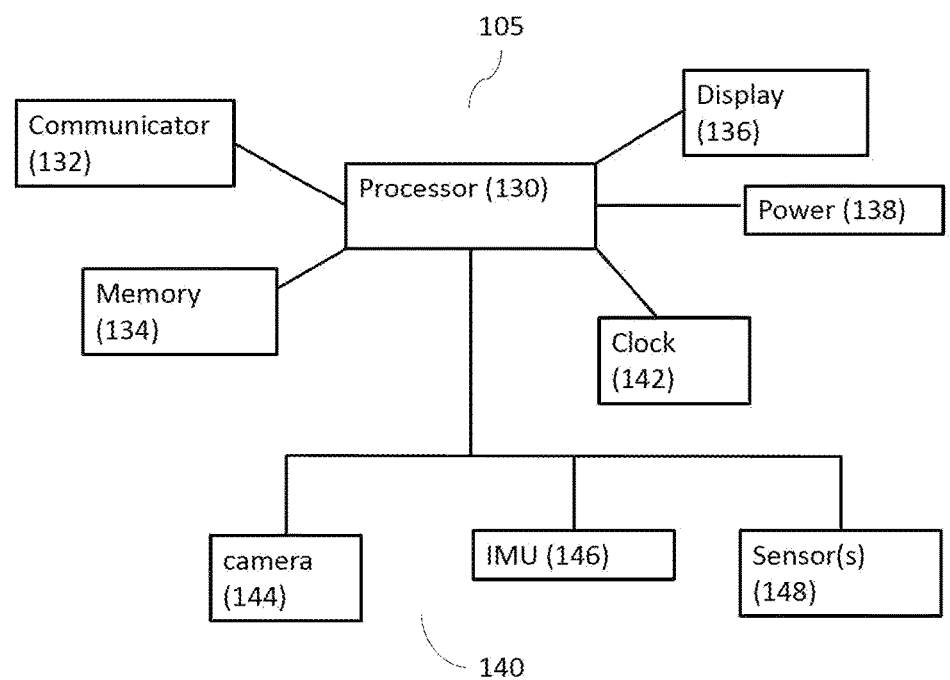
FIG. 1B shows a schematic of a non-limiting example of a wearable device, according to at least some embodiments.

FIG. 1B shows a schematic of a non-limiting example of a wearable device 105 according to at least some embodiments. For example, in some implementations, a wearable device 105 can include a processor 130, a communicator 132, a memory 134, a display 136, a clock 142, and a power supply 138, and/or a number of sensors 103. In some implementations, each of the communicator 132, the memory 134, the display 136, the clock 142, and the power supply 138 can be operatively coupled to the processor 130. In implementations where the sensors 103 are operatively coupled to the wearable device 105, the sensors can be operatively coupled to the processor 130 (e.g., via the communicator 132); in implementations where the sensors are included in the wearable device 105, the sensors can be directly and operatively coupled to the processor 130.

Throughout the present disclosure, a "module" may refer to a designated circuit, a software application, set of computer instructions/software operational on a processor, or a processor itself (e.g., ASIC), for carrying out noted functionality.

In some implementations, the processor 130 can be a general purpose processor, a Field Programmable Gate Array (FPGA), an Application Specific Integrated Circuit (ASIC), a Digital Signal Processor (DSP), and/or the like. The memory 134 can be a hardware module and/or component configured to store data accessible by the processor 130, and/or to store code representing executable instructions for the processor 130. The memory 134 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 134 stores instructions to cause the processor 130 to execute modules, processes and/or functions associated with the wearable device 105. The processor 130 can be configured to implement instructions stored in the memory 134. The memory 134 can be configured to store processor-readable instructions that are accessible and executable by the processor 130.

In some implementations, the communicator 132 can be an external communication channel device, including but not limited to a device for communicating on WiFi and/or cellular networks, through Bluetooth, through infrared, and/or through a similar communication modality. The communicator 132 can be operatively coupled to other electronic devices, e.g., such as the computational device 107, the sensors 103, and/or the like, and can be configured to send and/or receive data to and/or from the other electronic devices. In some implementations, the display 136 can be one of an audio, video, haptic feedback, and/or vibration display. In some implementations, display 136 can be configured to display image, video, and/or other data. In some implementations, power supply 138 can be configured to supply power to wearable device 105, for example through a battery and/or through an external power source. Processor 130 can also control a clock 142. In some implementations, the processor 130 can control a number of different sensors 103, e.g., including but not limited to a camera 144, a IMU 146 and and/or one or more other sensors 148.

In some implementations, wearable device 105 can be an electronic device that is wearable and/or portable for a user, e.g., including a headset device, a helmet device, a mobile device (e.g., such as a cellular telephone, a laptop, a tablet, and/or a similar device), and/or other such electronic devices. As one non-limiting example, a wearable device 105 can be a smartphone device operatively coupled to a head mount. The smartphone can include a number of sensors (e.g., such as a camera, an accelerometer, a gyroscope, an IR sensor, and/or other sensors). The wearable device 105 can be configured to receive sensor data from the sensors and send the sensor data to the computational device 107. In some implementations, the computational device can be included in the wearable device 105.

Optionally sensor 103 and wearable device 105 are contained in a single housing (not shown). Optionally computational device 107 is also contained within the housing. Alternatively, computational device 107 is external to the housing. Also alternatively, computational device 107 is remote from the housing, such that computational device 107 is located at a distance of at least 5 cm, a distance of at least 10 cm, a distance of at least 20 cm, any distance in between or a greater distance.

Figure 1C:
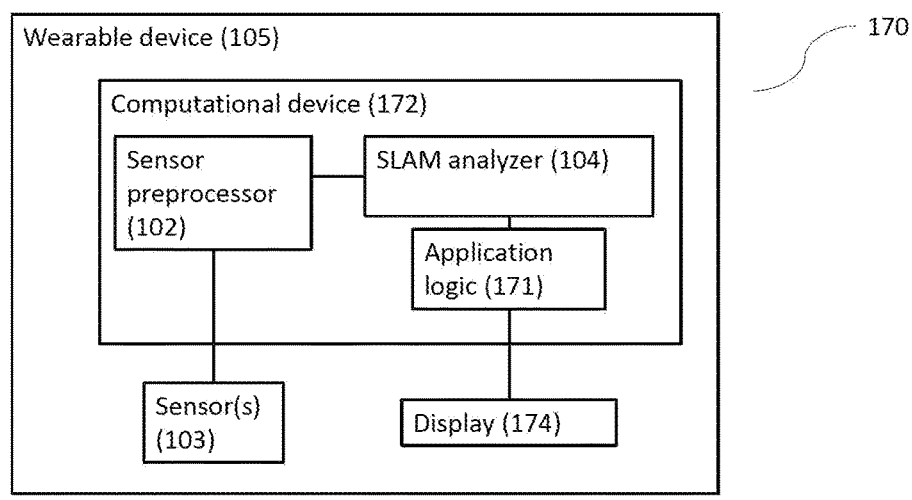
FIG. 1C shows a schematic of a non-limiting example of a combination of a wearable device and a computational device, according to at least some embodiments.

FIG. 1C shows a non-limiting, example, illustrative schematic combination of a wearable device and a computational device according to at least some embodiments, shown as a system 170. For example, in some implementations, system 170 can include computational device 107, wearable device 105, sensor preprocessor 102, SLAM analyzer 104 and application logic 171. In some implementations, the system 170 can also include one or more sensor(s) 103; in other implementations, the one or more sensors may be external to the system 170, and can be operatively coupled to system 170 so as to prove sensor data to the system 170. The application logic 171 can be implemented via hardware or software, and can be configured to support the operation, for example, of a VR and/or AR application. In some implementations, system 170 can also include a display 174 (e.g., similar to display 136 as described in FIG. 1B) configured to display the output of application logic 171, such as information related to operation of a VR or AR application. Display 174 can be one or more of an audio, video, haptic feedback or vibration display.

Figure 1D:
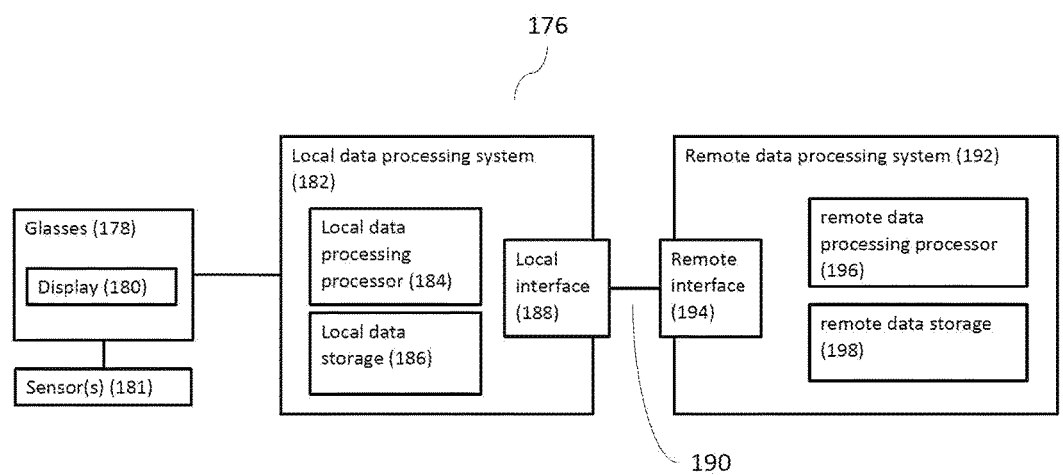
FIG. 1D shows another schematic of a non-limiting example of a combination of a wearable device, a local data processing system, and a remote data processing system, according to at least some embodiments.

FIG. 1D shows another non-limiting, exemplary, illustrative schematic combination of a wearable device 105 and a computational device 107 according to at least some embodiments, shown as a system 176. As shown, a system 176 can include a wearable device 105 such as a pair of smart glasses 178. Glasses 178 can include a display 180 similar to display 136 described in FIG. 1B. In some implementations, the glasses 178 can be operatively coupled to, for example, a local data processing system 182 (corresponding to the sensor preprocessor 102 of computational device 107), and optionally a remote processing system (according to some embodiments). Local data processing system 182 can, in turn, be operatively coupled to a remote data processing system 192 (e.g., corresponding to SLAM analyzer 104 and/or a similar analytics device), for example through a network 190. Network 190 can be a wired or wireless network, and can be one of a local area network (LAN), a cellular network, a wireless network (e.g., such as WiFi), a Bluetooth and/or similar network, and/or the like.

Local data processing system 182 can include, in some implementations, a local data processing module 184 (which may be referred to as a processor or module and may be hardware or software), a local data storage 186 and a local interface 188. The sensor(s) 103 can be configured to transmit sensor data to glasses 178, which are configured to transmit the sensor data to local data processor 184. Local data processor 184 can be configured to preprocess the sensor data. Local data processor 184 can also be configured to store the data in local data storage 186, and/or to transmit the data through local interface 188 and network 190 to the remote data processing system 192.

When the local data processing system 182 sends preprocessed sensor data to the remote data processing system 192, the remote data interface 194 of remote data processing system 192 can receive the preprocessed sensor data, and can store the preprocessed sensor data in remote data storage 198. The remote data processor 196 can be configured to analyze the data. For example, the remote data processor 196 can be configured to determine where the glasses 178 are oriented and/or where the glasses 178 have moved, using the preprocessed sensor data. In some implementations, the remote data processor 196 can be configured to determine other information relating to the glasses 178 based on the preprocessed sensor data. The remote data processor can then be configured to send the results of the analysis of the preprocessed sensor data to local data processing system 182, e.g., via the network 190. The local sensor processing system 182 can be configured to use the results to alter information displayed by display 180 in the glasses 178 (e.g., to alter an area of vision within a virtual environment, and/or the like).

Figure 2A:
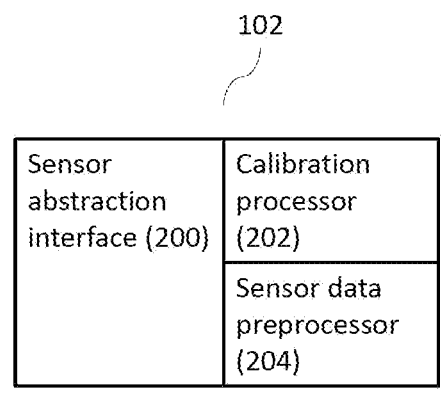
FIG. 2A shows a schematic of a non-limiting example of sensor preprocessor according to at least some embodiments.

FIG. 2A shows a non-limiting, exemplary, illustrative schematic sensor preprocessor 102 according to at least some embodiments. As shown, sensor preprocessor 102 can include a sensor abstraction interface 200, a calibration processor 202 and a sensor data preprocessor 204. Sensor abstraction interface 200 can abstract the incoming sensor data (for example, abstract incoming sensor data from a plurality of different sensor types), such that sensor preprocessor 102 preprocesses sensor-agnostic sensor data.

In some implementations, calibration processor 202 can be configured to calibrate the sensor input, such that the input from individual sensors and/or from different types of sensors can be calibrated. As an example of the latter, if a sensor's sensor type is known and has been analyzed in advance, calibration processor 202 can be configure to provide the sensor abstraction interface 200 with information about device type calibration (for example), so that the sensor abstraction interface 200 can abstract the data correctly and in a calibrated manner. For example, the calibration processor 202 can be configured to include information for calibrating known makes and models of cameras, and/or the like. Calibration processor 202 can also be configured to to perform a calibration process to calibrate each individual sensor separately, e.g., at the start of a session (upon a new use, turning on the system, and the like) using that sensor. The user (not shown), for example, can take one or more actions as part of the calibration process, including but not limited to displaying printed material on which a pattern is present. The calibration processor 202 can receive the input from the sensor(s) as part of an individual sensor calibration, such that calibration processor 202 can use this input data to calibrate the sensor input for each individual sensor. The calibration processor 202 can then send the calibrated data from sensor abstraction interface 200 to sensor data preprocessor 204, which can be configured to perform data preprocessing on the calibrated data, including but not limited to reducing and/or eliminating noise in the calibrated data, normalizing incoming signals, and/or the like. The sensor preprocessor 102 can then send the preprocessed sensor data to a SLAM analyzer (not shown).

Figure 2B:
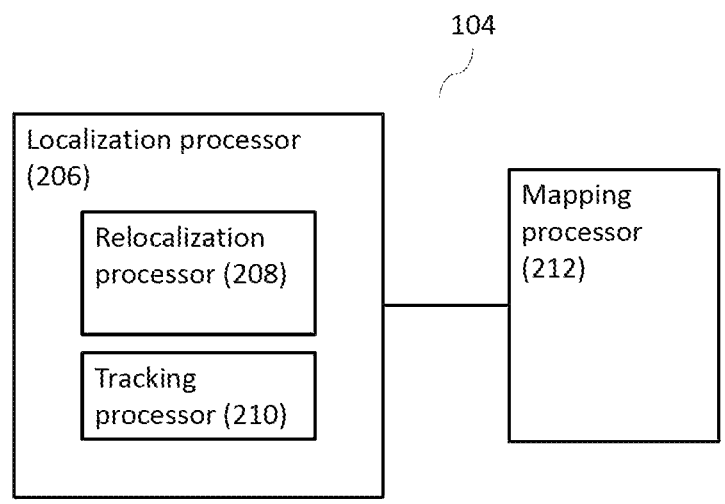
FIG. 2B shows a schematic of a non-limiting example of a SLAM analyzer according to at least some embodiments.

FIG. 2B shows a non-limiting, example, illustrative schematic SLAM analyzer 104, according to at least some embodiments. In some implementations, the SLAM analyzer 104 can include a localization processor 206 and a mapping processor 212. The localization processor 206 of the SLAM analyzer 104 can be operatively coupled to the mapping processor 212 and/or vice-versa. In some implementations, the mapping processor 212 can be configured to create and update a map of an environment surrounding the wearable device (not shown). Mapping processor 212, for example, can be configured to determine the geometry and/or appearance of the environment, e.g., based on analyzing the preprocessed sensor data received from the sensor preprocessor 102. Mapping processor 212 can also be configured to generate a map of the environment based on the analysis of the preprocessed data. In some implementations, the mapping processor 212 can be configured to send the map to the localization processor 206 to determine a location of the wearable device within the generated map.

In some implementations, the localization processor 206 can include a relocalization processor 208 and a tracking processor 210. Relocalization processor 208, in some implementations, can be invoked when the current location of the wearable device 105—and more specifically, of the one or more sensors 103 associated with the wearable device 105—cannot be determined according to one or more criteria. For example, in some implementations, relocalization processor 208 can be invoked when the current location cannot be determined by processing the last known location with one or more adjustments. Such a situation may arise, for example, if SLAM analyzer 104 is inactive for a period of time and the wearable device 105 moves during this period of time. Such a situation may also arise if tracking processor 210 cannot track the location of wearable device on the map generated by mapping processor 212.

In some implementations, tracking processor 210 can determine the current location of the wearable device 105 according to the last known location of the device on the map and input information from one or more sensor(s), so as to track the movement of the wearable device 105. Tracking processor 210 can use algorithms such as a Kalman filter, or an extended Kalman filter, to account for the probabilistic uncertainty in the sensor data.

In some implementations, the tracking processor 210 can track the wearable device 105 so as to reduce jitter, e.g., by keeping a constant and consistent error through the mapping process, rather than estimating the error at each step of the process. For example, the tracking processor 210 can, in some implementations, use the same or a substantially similar error value when tracking a wearable device 105.

In some implementations, the tracking processor 210 can track the wearable device 105 so as to reduce jitter, e.g., by mixing frame-to-frame with keyframe-to-frame tracking, as described in "Stable Real-Time 3D Tracking using Online and Offline Information", by Vacchetti et al. However, the method described in this paper relies upon manually acquiring keyframes, while for the optional method described herein, the keyframes are created dynamically as needed, as described in greater detail below (for example as described in the discussion of FIGS. 6-8). In some implementations, the tracking processor 210 can also use Kalman filtering to address jitter, can implement Kalman filtering in addition to, or in replacement of, the methods described herein.

In some implementations, the output of localization processor 206 can be sent to mapping processor 212, and the output of mapping processor 212 can be sent to the localization processor 206, so that the determination by each of the location of the wearable device 105 and the map of the surrounding environment can inform the determination of the other.

Figure 2C:
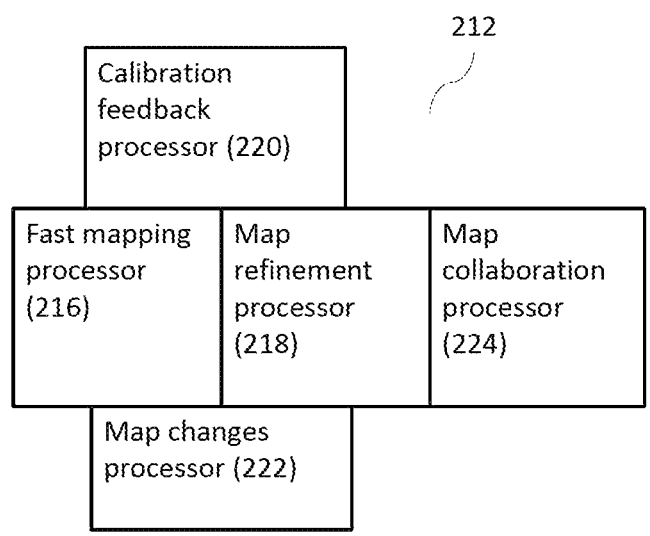
FIG. 2C shows a schematic of a non-limiting example of a mapping module according to at least some embodiments.

FIG. 2C shows a non-limiting, exemplary, illustrative schematic mapping module or processor according to at least some embodiments. For example, in some implementations, mapping module or processor 212 can include a fast mapping processor 216, a map refinement processor 218, a calibration feedback processor 220, a map changes processor 222 and a map collaboration processor 224. Each of fast mapping processor 216 and map refinement processor 218 can be in direct communication with each of calibration feedback processor 220 and map changes processor 222 separately. In some implementations, map collaboration processor 224 may be in direct communication with map refinement processor 218.

In some implementations, fast mapping processor 216 can be configured to define a map rapidly and in a coarse-grained or rough manner, using the preprocessed sensor data. Map refinement processor 218 can be configured to refine this rough map to create a more defined map. Map refinement processor 218 can be configured to correct for drift. Drift can occur as the calculated map gradually begins to differ from the true map, due to measurement and sensor errors for example. For example, such drift can cause a circle to not appear to be closed, even if movement of the sensor should have led to its closure. Map refinement processor 218 can be configured to correct for drift, by making certain that the map is accurate; and/or can be configured to spread the error evenly throughout the map, so that drift does not become apparent. In some implementations, each of fast mapping processor 216 and map refinement processor 218 is operated as a separate thread on a computational device (not shown). For such an implementation, localization processor 206 can be configured to operate as yet another thread on such a device.

Map refinement processor 218 performs mathematical minimization of the points on the map, including with regard to the position of all cameras and all three dimensional points. For example, and without limitation, if the sensor data comprises image data, then map refinement processor 218 may re-extract important features of the image data around locations that are defined as being important, for example because they are information-rich. Such information-rich locations may be defined according to landmarks on the map, as described in greater detail below. Other information-rich locations may be defined according to their use in the previous coarse-grained mapping by fast mapping processor 216.

The combination of the implementations of FIGS. 2B and 2C may optionally be implemented on three separate threads as follows. The tracking thread would optionally and preferably operate with the fastest processing speed, followed by the fast mapping thread; while the map refinement thread can operate at a relatively slower processing speed. For example, tracking can be operated at a process speed that is at least five times faster than the process speed of fast mapping, while the map refinement thread can be operated at a process speed that is at least 50% slower than the speed of fast mapping. The following processing speeds could be implemented as a non-limiting example: tracking being operated in a tracking thread at 60 Hz, fast mapping thread at 10 Hz, and the map refinement thread being operated once every 3 seconds.

Calibration feedback processor 220 can be operated in conjunction with input from one or both of fast mapping processor 216 and map refinement processor 218. For example, the output from map refinement processor 218 can be used to determine one or more calibration parameters for one or more sensors, and/or to adjust such one or more calibration parameters. For the former case, if the sensor was a camera, then output from map refinement processor 218 can be used to determine one or more camera calibration parameters, even if no previous calibration was known or performed. Such output can be used to solve for lens distortion and focal length, because the output from map refinement processor 218 can be configured to indicate where calibration issues related to the camera were occurring, as part of solving the problem of minimization by determining a difference between the map before refinement and the map after refinement. Alternatively or additionally, such calibration can feed into the mapping process, whether by fast mapping processor 216 and/or map refinement processor 218.

Map changes processor 222 can also be operated in conjunction with input from one or both of fast mapping processor 216 and map refinement processor 218, to determine what change(s) have occurred in the map as a result of a change in position of the wearable device. Map changes processor 222 can also receive output from fast mapping processor 216, to determine any coarse-grained changes in position. Map changes processor 222 can also (additionally or alternatively) receive output from map refinement processor 218, to determine more precise changes in the map. Such changes can include removal of a previous validated landmark, or the addition of a new validated landmark; as well as changes in the relative location of previously validated landmarks. By "validated landmark" it is meant a landmark whose location has been correctly determined and confirmed, for example by being found at the same location for more than one mapping cycle.

Such changes can be explicitly used to increase the speed and/or accuracy of further localization and/or mapping activities, and/or can be fed to an outside application that relies upon SLAM in order to increase the speed and/or efficacy of operation of the outside application. By "outside application" it is meant any application that is not operative for performing SLAM.

As a non-limiting example of feeding this information to the outside application, such information can be used by the application, for example to warn the user that one of the following has occurred: a particular object has been moved; a particular object has disappeared from its last known location; or a new specific object has appeared. Such warning can be determined according to the available information from the last time the scene was mapped.

Map changes processor 222 can have a higher level understanding for determining that a set of coordinated or connected landmarks moved or disappeared, for example to determine a larger overall change in the environment being mapped. Again, such information may be explicitly used to increase the speed and/or accuracy of further localization and/or mapping activities, and/or may be fed to an outside application that relies upon SLAM in order to increase the speed and/or efficacy of operation of the outside application.

Map collaboration processor 224 can receive input from map refinement processor 218 in order for a plurality of SLAM analyzers in conjunction with a plurality of wearable devices to create a combined, collaborative map. For example, a plurality of users, wearing a plurality of wearable devices implementing such a map collaboration processor 224, can receive the benefit of pooled mapping information over a larger area. As a non-limiting example only, such a larger area can include an urban area, including at least outdoor areas, and also including public indoor spaces. Such a collaborative process can increase the speed and efficiency with which such a map is built, and can also increase the accuracy of the map, by receiving input from a plurality of different sensors from different wearable devices. While map collaboration processor 224 can also receive and implement map information from fast mapping processor 216, for greater accuracy, data from map refinement processor 218 is used.

Optionally, computational device 107 from FIG. 1A comprises a hardware processor configured to perform a predefined set of basic operations in response to receiving a corresponding basic instruction selected from a predefined native instruction set of codes, and memory. SLAM analyzer 104 optionally comprises a first set of machine codes selected from the native instruction set for receiving sensor data, which may be optical sensor data. SLAM analyzer 104 optionally comprises a second set of machine codes selected from the native instruction set for operating a localization module (such as the instructions for localization processor 206), a third set of machine codes selected from the native instruction set for operating a fast mapping module (such as the instructions for fast mapping processor 216); and a fourth set of machine codes selected from the native instruction set for operating a map refinement module (such as the instructions for map refinement processor 218). Each of the first, second, third and fourth sets of machine code is stored in the memory of computational device 107.

Figure 3A:
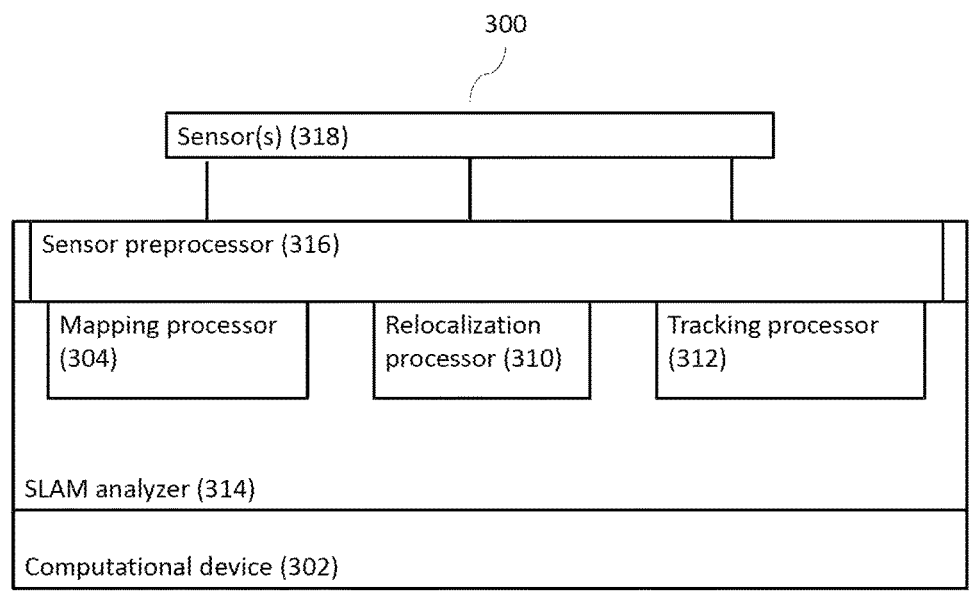
FIG. 3A shows a schematic of another non-limiting example of a system according to at least some embodiments.

FIG. 3A shows a schematic of another non-limiting example system according to at least some embodiments of the present invention, relating to one or more sensors communicating with a computational device, shown as a system 300. As shown, system 300 includes a computational device 302 in communication with one or more sensors 318. Sensor(s) 318 may comprise any type of sensor as described in the present disclosure, or a plurality of different types of sensors.

Computational device 302 preferably operates a sensor preprocessor 316, which may optionally operate as previously described for other sensor preprocessors. Preferably, sensor preprocessor 316 receives input data from one or more sensors 318 and processes the input data to a form which is suitable for use by SLAM analyzer 314. SLAM analyzer 314 may operate as previously described for other SLAM analyzers.

SLAM analyzer 314 preferably comprises a mapping module or processor 304, which may operate as previously described for other mapping modules, and thus, perform mapping functions as previously described. SLAM analyzer 314 also preferably includes a relocalization module or processor 310 and a tracking module or processor 312. While in some embodiments relocalization module 310 and tracking module 312 can be separate modules, relocalization module 310 and tracking module 312 may be combined in a single module.

Relocalization module 310 may operate as previously described relocalization modules in the disclosure, so as to determine the location of system 300 (or rather of sensor(s) 318) in case such a location cannot be determined from a previously known location of same and data from sensor(s) 318. Furthermore, tracking module 312 may optionally operate as previously described for other tracking modules, to determine the location of system 300 (or rather of sensor(s) 318) from a previously known location of same and data from sensor(s) 318.

Figure 3B:
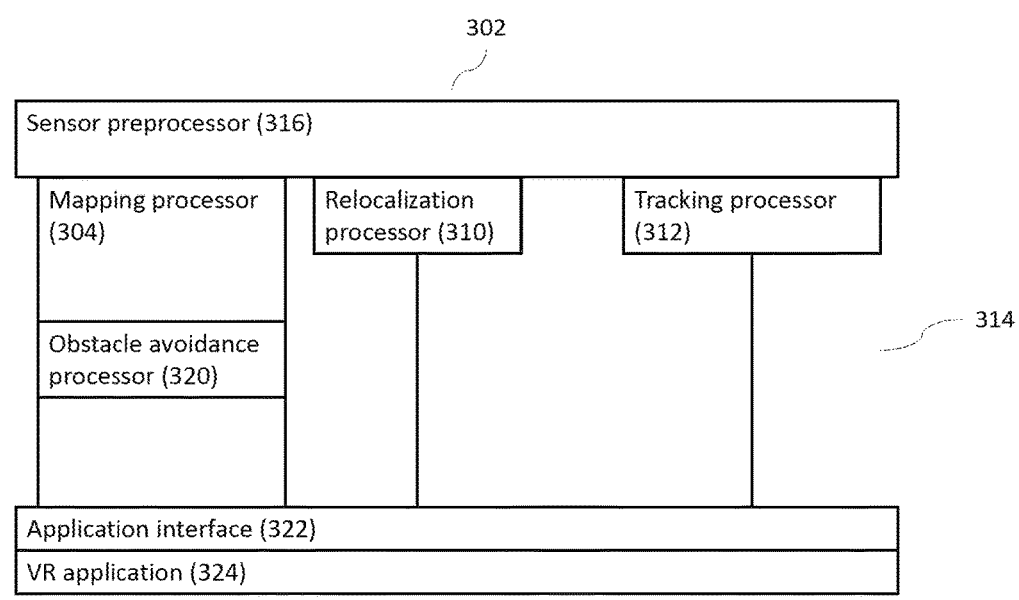
FIG. 3B shows a schematic of a non-limiting example implementation of a computational device operating at least some components of the system according to at least some embodiments.

FIG. 3B shows a schematic of a non-limiting example of a computational device operating at least some components of the system according to at least some embodiments of the present disclosure. System 302 includes some of the same components as FIG. 3A (which are shown with the same numbering). SLAM analyzer 314 of system 302 preferably features an obstacle avoidance module or processor 320, which is optionally and preferably operated/controlled by mapping module or processor 304. Obstacle avoidance module 320 is configured to detect and map potential obstacles in a real, physical world, so as to assist the user of the wearable device 105 in avoiding potential obstacles. By tracking validated (i.e., actual) landmarks and corresponding geometry thereof in the real, physical world, mapping processor 212 can provide such information to obstacle avoidance processor, enabling the obstacle avoidance processor to identify such landmarks as potential obstacles. The obstacle avoidance processor can thus be used to determine the distance of the landmarks to the user and/or a distance from the user to sensor(s) 103 that are providing the input data used for mapping.

In some implementations, the output of SLAM analyzer 104 (which may include information about the potential obstacles) is passed through an application interface to a VR (virtual reality) application. Optionally, both the application interface 322 and VR application 324 are operated by computational device 107 (e.g., for either or both of the schematics shown in FIGS. 3A and 3B). The VR application can use the mapping and localization information to feed into the map of the virtual world, as well as the location of the representation of the user, or "avatar", on such map. In addition, the VR application 324 can use information regarding potential obstacles as input to the map of the virtual world. For example, the VR application 324 can display a wall in the virtual world that corresponds to the location and geometry of a wall in the physical world, according to the information received. VR application 324 could also optionally receive other types of information, for example, regarding the location and movement of an object held in the user's hand (not shown), which would be extraneous to SLAM analyzer 314.

Figure 3C:
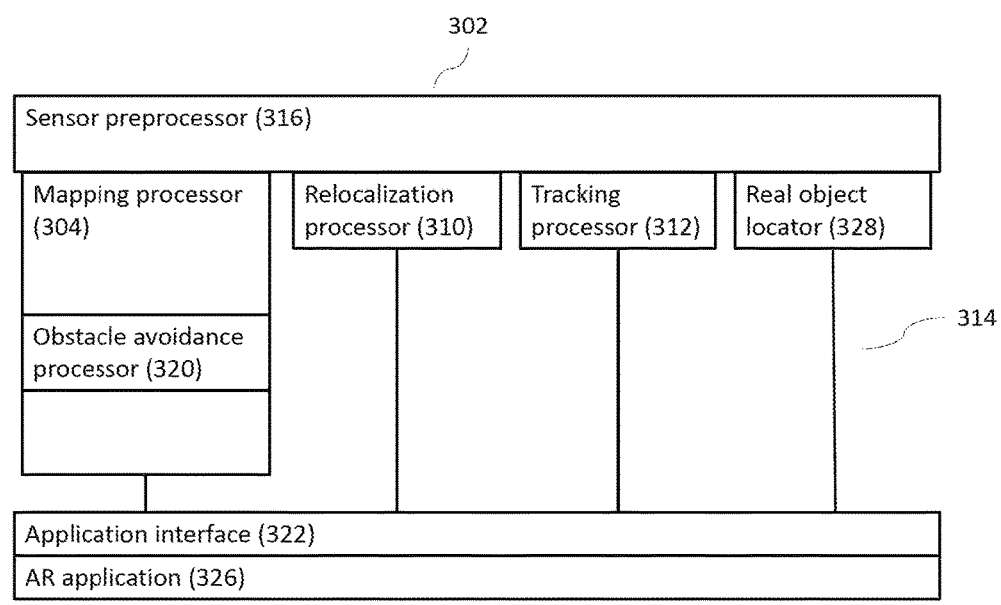
FIG. 3C shows a schematic of another non-limiting example implementation of a computational device operating at least some components of the system according to at least some embodiments.

FIG. 3C shows a schematic of another non-limiting example of a computational device operating at least some components of the system according to at least some embodiments of the present invention, shown as a system 330. As shown, system 328 includes some of the same components as FIGS. 3A and 3B, which are shown with the same numbering. System 330 preferably further includes, as part of SLAM analyzer 314, a real object locator 328. Real object locator 328 is optionally and preferably separate from obstacle avoidance module 320, in order to provide more detailed information about a specific object. In some embodiments, real object locator 328 provides such precise information so as to provide a more realistic analysis of the geometry and appearance of objects which may be required for operation with an AR (augmented reality) application 326. Because augmented reality mixes the display of real and rendered virtual objects, interactions between the real and virtual objects are configured to be as realistic as possible, particularly if the user interacting with real and virtual objects through the AR world provided. Real object locator 328 preferably provides sufficient information for interactions between the AR components and the real object—again, so as to be as realistic as possible. For example, light "shone" on a rendered virtual object should be similar to the light that would be shone, or is shone, on a real object in that position according to the light in the room. Incorrect lighting conditions for virtual objects results in less realism for the user of the AR application (i.e., reduces the realism of interactions between real and virtual objects).

In some embodiments, SLAM is not necessarily required to determine the characteristics of real world objects, if the characteristics of that object are known in advance. For example, for a mechanic using AR application 326 to assist in repair of a car engine, the mechanic could presumably reference the specification for that car engine, which may then be used by AR application 326 to reproduce the basic object. However, any changes from the standard basic car engine, such as the presence of damage or of an extraneous object, or the absence of an expected object, may be handled by real object locator 328.

Additionally, mapping module 304 may feature a map refinement module (as previously described but not shown). Such a map refinement module is particularly preferred for AR type applications because drift in the map can be more rapidly apparent with such applications, due to the mix of virtual and real world objects.

Figure 4:
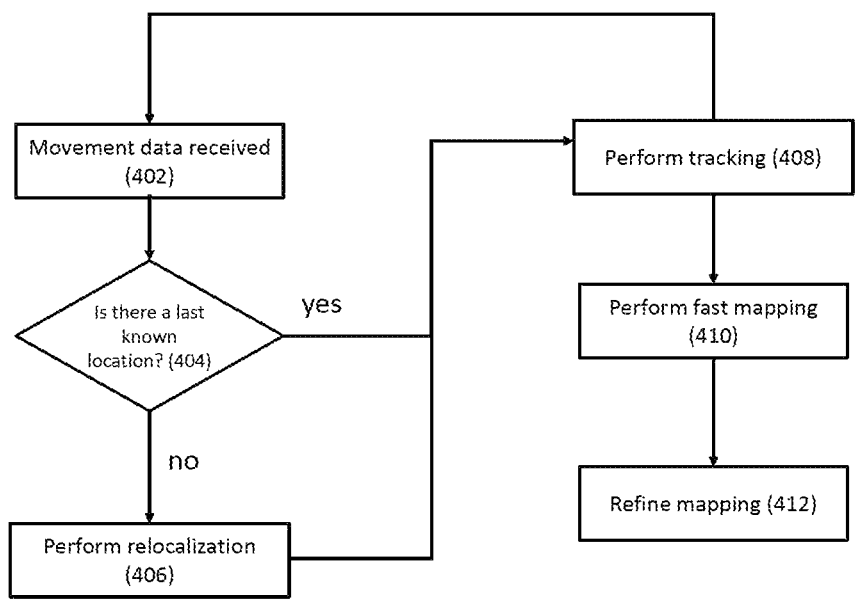
FIG. 4 shows a non-limiting exemplary method for performing SLAM according to at least some embodiments.

FIG. 4 shows a non-limiting exemplary method for performing SLAM according to at least some embodiments of the present disclosure. As shown, a user moves 402 (e.g., his head and/or other body part/body) wearing the wearable device, such that sensor data is received from one or more sensors at 404. The sensor data received is related to such movement. For this non-limiting example, the wearable device is assumed to be a headset of some type that is worn on the head of the user. The headset is assumed to contain one or more sensors, such as a camera for example.

At 404, it is determined whether there is a last known location of the wearable device according to previous sensor data. If not, then relocalization is preferably performed at 406 according to any method described herein, in which the location of the wearable device is determined again from sensor data. For example, if the sensor is a camera, such that the sensor data is a stream of images, relocalization could optionally be used to determine the location of the wearable device from the stream of images, optionally without using the last known location of the wearable device as an input. Relocalization in this non-limiting example is optionally performed according to the RANSAC algorithm, described for example in "Random sample consensus: a paradigm for model fitting with applications to image analysis and automated cartography" by Fischler and Bolles (available from http://dl.acm.org/citation.cfm?id=358692). For this algorithm, as described in greater detail below, the images are decomposed to a plurality of features. The features are considered in groups of some predetermined number, to determine which features are accurate. The RANSAC algorithm is robust in this example because no predetermined location information is required.

In 408, once the general location of the wearable device is known, then tracking is performed. Tracking is used to ascertain the current location of the wearable device from general location information, such as the last known location of the wearable device in relation to the map, and the sensor data. For example, if the sensor data is a stream of images, then tracking is optionally used to determine the relative change in location of the wearable device on the map from the analyzed stream of images, relative to the last known location on the map. Tracking in this non-limiting example may optionally be performed according to non-linear minimization with a robust estimator, in which case the last known location on the map may optionally be used for the estimator. Alternatively, tracking may optionally be performed according to the RANSAC algorithm or a combination of the RANSAC algorithm and non-linear minimization with a robust estimator.

After tracking is completed for the current set of sensor data, the process preferably returns at 402 for the next set of sensor data, as well as continuing at 410. Preferably, as described herein, the tracking loop part of the process (repetition of 402-408) operates at 60 Hz (but other frequencies are within the scope of the present disclosure).

At 410, coarse grained, fast mapping is preferably performed as previously described. If the sensor data is a stream of images, then preferably selected images (or "keyframes") are determined as part of the mapping process. During the mapping process each frame (the current frame or an older one) may optionally be kept as a keyframe. Not all frames are kept as keyframes, as this would slow down the process. Instead, a new keyframe is preferably selected from frames showing a poorly mapped or unmapped part of the environment. One way to determine that a keyframe shows a poorly mapped or unmapped part of the environment is when many new features appear (features for which correspondences do not exist in the map). Another way is to compute geometrically the path of the camera. When the camera moves so that the view field partially leaves the known map, preferably a new keyframe is selected.

Optionally and preferably, 408 and 410 are performed together, in parallel, or at least receive each other's output as each stage is performed. The impact of mapping and tracking on each other is important for the "simultaneous" aspect of SLAM to occur.

At 412, the map may be refined, to increase the precision of the mapping process, which may be performed according to bundle adjustment, in which the coordinates of a group or "bundle" of three dimensional points is simultaneously refined and optimized according to one or more criteria (see for example the approaches described in B. Triggs; P. McLauchlan; R. Hartley; A. Fitzgibbon (1999). "Bundle Adjustment—A Modern Synthesis". ICCV '99: Proceedings of the International Workshop on Vision Algorithms. Springer-Verlag. pp. 298-372). Such a refined map is preferably passed back to the relocalization, tracking and fast mapping processes.

Figure 5:
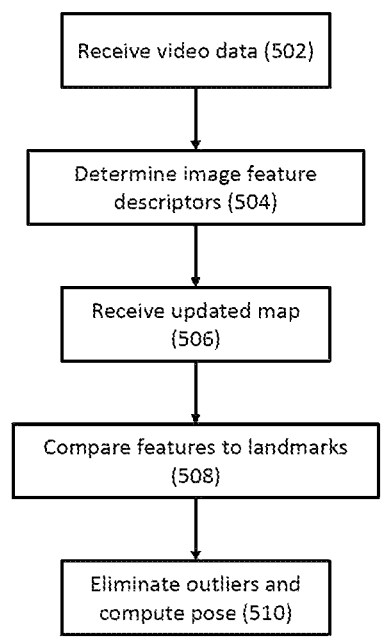
FIG. 5 shows a non-limiting exemplary method for performing localization according to at least some embodiments.

FIG. 5 shows a non-limiting example of a method for performing localization according to at least some embodiments of the present disclosure. It is worth noting that the method shown in FIG. 5 may be performed for initial localization, when SLAM is first performed, and/or for relocalization. While, the method may be performed for tracking (as described herein), such may be too computationally expensive and/or slow, depending upon the computational device being used. For example, the method shown in FIG. 5, in some embodiments, may operate too slow or require computational resources which are not presently available on current smartphones.

Figure 6:
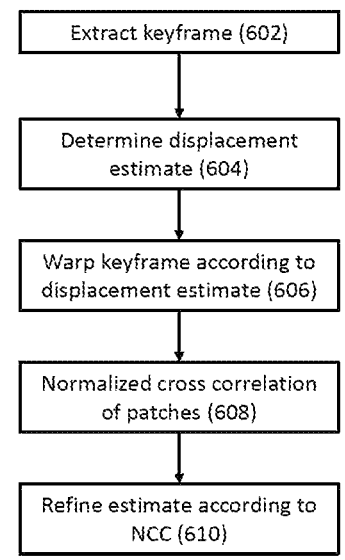
FIG. 6 shows another non-limiting example of a method for performing localization according to at least some embodiments.
Figure 7:
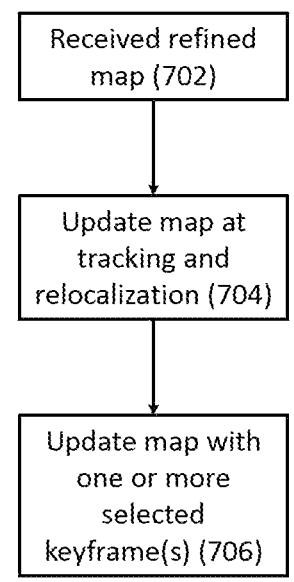
FIG. 7 shows a non-limiting example of a method for updating system maps according to map refinement, according to at least some embodiments of the present invention.

With respect to FIGS. 5-7, and for the purpose of illustration only (without intending to be limiting), the SLAM method is assumed to be performed on sensor data which includes a plurality of images from a camera. Accordingly, at 502, a plurality of images, such as a plurality of video frames, is obtained, which may optionally be preprocessed (as described herein), such that the video data is suitable for further analysis. At 504, one or more image feature descriptors are determined for each feature point in each frame. A feature point may be determined according to information provided by that feature, such that an information-rich portion of the image may optionally be determined to be a feature. Determination of whether a portion of the image is information-rich may optionally be determined according to the dissimilarity of that portion of the image from the remainder of the image. For example, and without limitation, a coin on an otherwise empty white surface would be considered to be the information-rich part of the image.

Other non-limiting examples of information-rich portions of an image include boundaries between otherwise homogenous objects. As used herein, the term "feature point" may optionally relate to any type of image feature, including a point, an edge and so forth.

As part of this process, a plurality of feature points in the frames are searched. Optionally, such searching is performed using the FAST analytical algorithm, as described for example in "Faster and better: a machine learning approach to corner detection", by Rosten et al, 2008 (available from https://arxiv.org/pdf/0810.2434). The FAST algorithm optionally uses the newly selected keyframe(s) to compare the feature points in that keyframe to the other, optionally neighboring, keyframes, by triangulation for example.

For each feature point, a descriptor, which is a numerical representation of the appearance of the surrounding portion of the image around the feature point, may be calculated, with an expectation that two different views of the same feature point will lead to two similar descriptors. In some embodiments, the descriptor may optionally be calculated according to the ORB standard algorithm, for example as described in "ORB: an efficient alternative to SIFT or SURF" (available from http://www.willowgarage.com/sites/default/files/orb_final.pdf); and in "ORB-SLAM2: an Open-Source SLAM System for Monocular, Stereo and RGB-D Cameras" by Mur-Artal and Tardos, 2016 (available from https://arxiv.org/abs/1610.06475).

Next, an updated map is received at 506, which features a plurality of landmarks (which as previously described, are preferably validated landmarks). At 508, the descriptors of at least some features in at least some frames are compared to the landmarks of the map. The landmarks of the map are preferably determined according to keyframes, which may optionally be selected as previously described. To avoid requiring comparison of all features to all landmarks, descriptors and/or images may be sorted, for example, according to a hash function, into groupings representing similarity, such that only those descriptors and/or images that are likely to be similar (according to the hash function) are compared.

In such embodiments, each feature point may include a descriptor, which is a 32-byte string (for example). Given the map contains a plurality of landmarks, comparing each descriptor to all landmarks, as noted above, requires a great deal of computational processing and resources. Accordingly, a vocabulary tree may be used to group descriptors according to similarity: similar descriptors may be assigned the same label or visual word. Accordingly, for each keyframe in the map, all labels associated with that key frame may be considered (each label being related to a feature point on that map). For each label or visual map, in some embodiments, a list of key frames containing that label may be made. Then, for a new frame, the visual word may be computed. Next, a list of keyframes in which similar visual words appear is reviewed, with the subject keyframes being a set of candidates for matching to one and/or another. The vocabulary tree therefore enables more efficient assignment of the visual words, which, in turn, enables sets of candidate keyframes for matching to be more efficiently selected. These candidates may then be used more precisely to relocalize. Non-limiting examples of implementations of such a method are described in "Bags of Binary Words for Fast Place Recognition in Image Sequences" (by Gálvez-López and Tardós, IEEE Transactions on Robotics, 2012, available from http://ieeexplore.ieee.org/document/6202705/) and "Scalable Recognition with a Vocabulary Tree" (by Stewenius and Nister, 2006, available from http://dl.acm.org/citation.cfm?id=1153548). One of skill in the art will appreciate that this method may also be used for tracking, for example, a specific object, or alternatively, for tracking generally as described herein.

At 510, outlier correspondences may be eliminated, for example, according to statistical likelihood of the features and the landmarks being correlated, and a pose (position and orientation) is calculated, preferably simultaneously. Optionally a method such as RANSAC may be implemented to eliminate such outliers and to determine a current pose, with such methods performing both functions simultaneously. The pose of the sensor reporting the data may be calculated according to the correspondences between the features on the map and the landmarks that were located with the sensor data. RANSAC may optionally be implemented according to OpenCV, which is an open source computer vision library (available at http://docs.opencv.org/master/d9/d0c/group_calib3d.html#gsc.tab=0).

FIG. 6 shows another non-limiting exemplary method for performing localization according to at least some embodiments of the present disclosure. The method shown, according to some embodiments, is computationally faster and less expensive than the method of FIG. 5. Furthermore, the method of FIG. 6 is computationally suitable for operation on current smartphones. Optionally, the method described herein may be used for tracking, where the previous known location of the sensor providing the sensor data is sufficiently well known to enable a displacement estimate to be calculated, as described in greater detail below.

At 602, a keyframe is selected from a set of keyframes in the map (optionally a plurality of keyframes is selected). The selection of the keyframe may optionally be performed either around FAST feature points (as determined by the previously described FAST algorithm) or around reprojection locations of map landmarks with respect to the features on the keyframe(s). This provides a relative location of the features in the keyframe(s) with their appearance according to the pixel data. For example, a set of landmarks that are expected to be seen in each keyframe is used to determine the features to be examined.

At 604, a displacement estimate on the map may be determined, which is an estimate of the current location of the sensor providing the sensor data, which (as in earlier examples) may be a camera providing a plurality of images, according to the previous known position. For example, assumptions can be made of either no motion, or, of constant velocity (estimate; assuming a constant rate of motion). In another example, performed with an IMU, sensor data may be provided in terms of rotation (and optionally other factors), which could be used to determine a displacement estimate.

At 606, one or more patches of the keyframe(s) is warped according to the displacement estimate around each feature of the keyframe(s). Warping may optionally be performed according to homography, exemplary methods for which are described in greater detail below. Accordingly, the number of features may have a greater effect on computational resources than the number of keyframes, as the number of patches ultimately determines the resources required. According to some embodiments, the displacement estimate includes an estimation of translocation distance and also of rotation, such that the keyframe(s) is adjusted accordingly.

At 608, the NCC (normalized cross-correlation) of the warped keyframes is preferably performed. The displacement estimate may then be adjusted according to the output of the NCC process at 610. Such an adjusted estimate may yield a location, or alternatively, may result in the need to perform relocalization, depending upon the reliability of the adjusted displacement estimate. The NCC output may also be used to determine reliability of the adjusted estimate.

FIG. 7 shows a non-limiting exemplary method for updating system maps according to map refinement, according to at least some embodiments. At 702, the refined map is received, which can be refined according to bundle adjustment as previously described. At 704, the refined map is used to update the map at the relocalization and tracking processors, and therefore forms the new base map for the fast mapping process. At 706, the map is then updated by one or more selected keyframe(s) for example by the fast mapping process.

Figure 8:
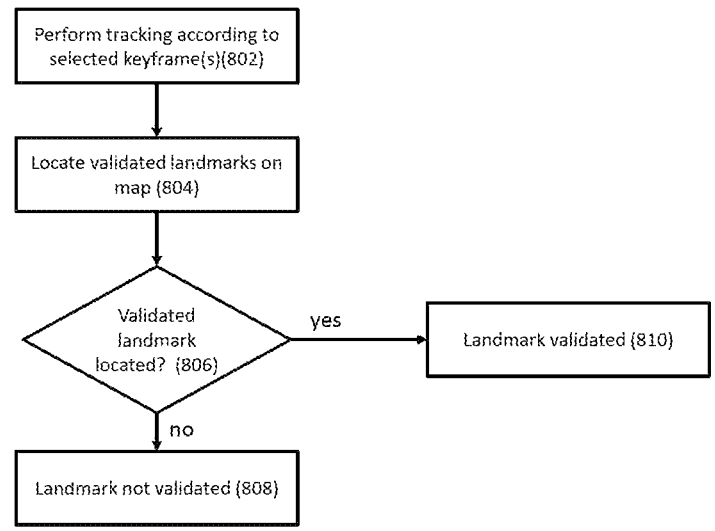
FIG. 8 shows a non-limiting example of a method for validating landmarks according to at least some embodiments of the present invention.

FIG. 8 shows a non-limiting, exemplary illustrative method for validating landmarks according to at least some embodiments. For example, at 802, a selected keyframe is applied to the currently available map in order to perform tracking. At 804, one or more validated landmarks are located on the map according to the applied keyframe. At 806, it is determined whether a validated landmark can be located on the map after application of the keyframe. At 810, if the landmark cannot be located, then it is no longer validated. In some implementations, failing to locate a validated landmark once may not cause the landmark to be invalidated; rather, the landmark may be invalidated when a statistical threshold is exceeded, indicating that the validated landmark was failed to be located according to a sufficient number and/or percentage of times. According to this threshold, the validated landmark may no longer be considered to be validated. At 808, if the landmark is located, then the landmark is considered to be a validated landmark.

Figure 9A:
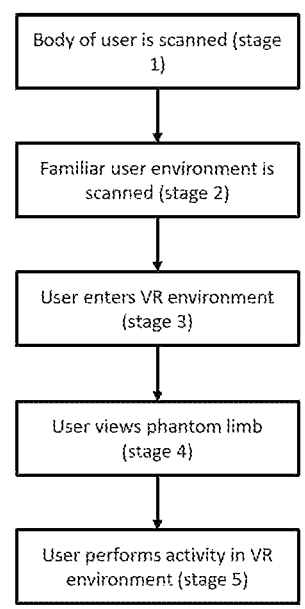
FIGS. 9A and 9B are example logic flow diagrams illustrating the performance of actions in a VR environment, according to at least some embodiments.

FIG. 9A shows an illustrative, exemplary, non-limiting method for applying VR to medical therapeutics according to at least some embodiments of the present disclosure, for assisting an amputee to overcome phantom limb syndrome. In this non-limiting example, the amputee is referred to as the user. As shown, at stage 1 the body of the user or a portion thereof, such as the torso and/or a particular limb, may be scanned. Such scanning may be performed in order to create a more realistic avatar for the user to view in the VR environment, so that, for example, when the user "looks down" in the VR environment, he/she can see body parts that realistically appear to "belong" to the user's own body.

In some implementations, at stage 2, a familiar environment for the user is scanned which may be performed in order to create a more realistic version of the environment for the user in the VR environment. The user may then look around the VR environment and see virtual objects that correspond in appearance to real objects with which the user is familiar.

In some implementations, the user enters the VR environment at stage 3, for example, by having a wearable such as a headset with a screen on the head of the user. The wearable may be constructed as described herein, with one or more sensors to provide data such that movement could be detected, and such that SLAM may optionally be performed as described herein.

In some implementations, at stage 4, the user "views" the phantom limb—that is, the limb that was amputated—as still being attached to the body of the user. For example, if the amputated limb was the user's left arm, then the user sees their left arm as still attached to their body as a functional limb, within the VR environment. In order to enable the amputated limb to be activated as used, the user's functioning right arm may be used to create a "mirror" left arm. In this example, when the user moved his or her right arm, the mirrored left arm appears to move and could be viewed as moving in the VR environment. In some embodiments, SLAM may (and preferably) be used to analyze the sensor data, and to correctly locate the parts of the user's body that were visible, as well as to correctly locate the position of the user's body in the VR environment.

If a familiar environment for the user was scanned previously, then the VR environment can be rendered to appear to be that familiar environment. Creating the familiar environment can lead to powerful therapeutic effects for the user, for example as described below in regard to reducing phantom limb pain.

Figure 9B:
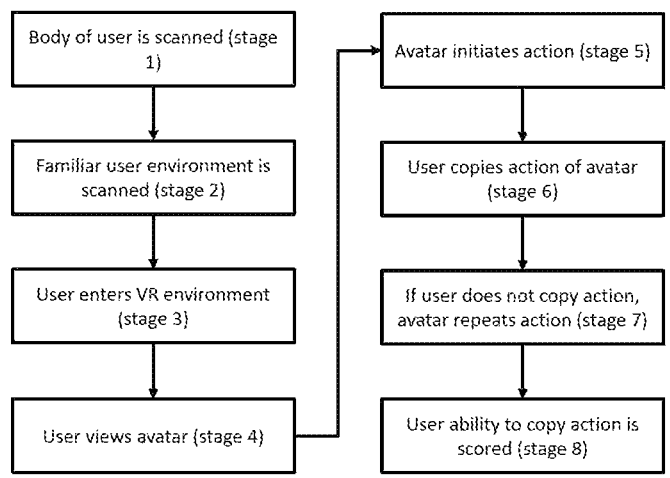

In some implementations, at stage 5, the ability to view the phantom limb may be (and preferably be) incorporated into one or more therapeutic activities, such as the "Simon says" activity described with regard to FIG. 9B, in which the user is asked to mimic the activities of a viewed second player in the VR environment.

In some embodiments, this method may be used to reduce phantom limb pain, in which an amputee feels strong pain that is associated with the missing limb. While such pain has been successfully treated with mirror therapy, in which the amputee views the non-amputated limb in a mirror (see for example, Kim and Kim, "Mirror Therapy for Phantom Limb Pain", Korean J Pain. 2012 October; 25(4): 272-274), the VR environment described herein can provide a more realistic and powerful way for the user to view and manipulate the non-amputated limb, and hence to reduce phantom limb pain.

FIG. 9B shows another illustrative, exemplary, non-limiting method for applying VR to medical therapeutics according to at least some embodiments of the present disclosure; specifically, for providing a therapeutic environment to a subject who has suffered a stroke (e.g., as a non-limiting example of a brain injury). In this non-limiting example, the subject is encouraged to play a game of "Simon says" in order to treat hemispatial neglect, although of course other treatment methods may be employed instead. In the game of "Simon says", one player (which in this example could be a VR avatar) performs an action which the other players must copy—but only if the "Simon" player says "Simon says to (perform the action)". Of course, this requirement may be dropped (for this non-limiting example), which is described only in terms of viewing and copying actions by the user.

Stages 1-3 of FIG. 9A may be performed for this method as well. In some implementations, only stage 3 may be performed, so that the user enters the VR environment. In stage 4, the user can view an avatar, which is optionally another player (such as a therapist) or alternatively is a non-player character (NPC) generated by the VR system. Preferably, the user perceives the avatar as standing in front of him or her, and as facing the user. The user has his or her own avatar, which represents those parts of the user's body that are normally visible to the user according to the position of the user's head and body. This avatar is referred to in this non-limiting example as the user's avatar.

In stage 5, the avatar initiates an action, which the user is to mimic with the user's own body. In stage 6, the user can copy—or at least attempts to copy—the action of the avatar. The user can see the avatar, as well as those parts of the user's avatar that are expected to be visible according to the position of the user's head and body.

Optionally, for stages 5 and 6, the user's avatar can also be placed in front of the user, for example next to the "Simon" avatar. The user can then see both the Simon avatar, whose visual action(s) the user copies, and how the user's body is actually performing those actions with the user's avatar.

In stage 7, if the user fails to correctly copy the action of the Simon avatar, that avatar preferably repeats the action. This process may optionally continue for a predetermined period of rounds or until the user achieves at least one therapeutic goal.

In stage 8, the ability of the user to perform such actions is optionally scored.

Figure 10A:
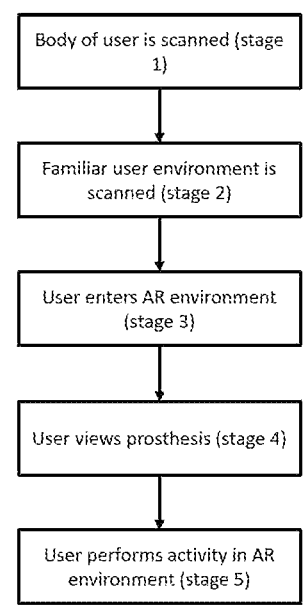
FIGS. 10A and 10B are example logic flow diagram illustrating the performance of actions in an AR environment, according to at least some embodiments.
Figure 10B:
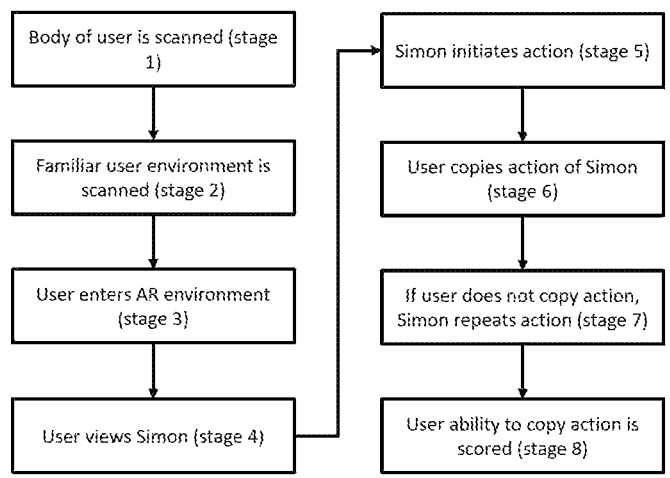

FIGS. 10A and 10B illustrate two examples of non-limiting methods for applying AR to medical therapeutics according to at least some embodiments of the present disclosure.

FIG. 10A shows an illustrative, exemplary, non-limiting method for applying AR to medical therapeutics disclosure, for assisting an amputee to overcome phantom limb syndrome. In this non-limiting example, the amputee is referred to as the user. Stages 1 and 2 may be identical to stages 1 and 2 of FIG. 9A. However, stage 2 may only be used to scan one or more real world objects that are familiar to the user, rather than the entire environment.

In stage 3, the user enters the AR environment, for example by having a wearable such as a headset with a screen wearable may be constructed as described herein, with one or more sensors to provide data such that movement could be detected, and such that SLAM could optionally be performed as described herein.

In stage 4, the user "views" the prosthesis (although alternatively the user could view the phantom limb and perform similar activities in the AR environment as for the VR environment described above).

In this example, when the user moved his or her prosthesis, the prosthesis appears to move and could be viewed as moving in the AR environment. SLAM may be and preferably is used to analyze the sensor data, and to correctly locate the parts of the user's body that were visible, as well as to correctly locate the position of the user's body in the AR environment.

In stage 5, the user performs an activity in the AR environment with the prosthesis, for example to grasp and manipulate an overlaid virtual object, or to perform a "Simon says" type of therapeutic activity, or a combination thereof.

Optionally and preferably, the methods of FIGS. 9A and 10A can be used sequentially, to both help the amputee overcome phantom limb pain and also to help increase the ability of the amputee to use his or her prosthesis. The methods may also be used in repeated cycles.

FIG. 10B shows another illustrative, exemplary, non-limiting method for applying AR to medical therapeutics disclosure, for providing a therapeutic environment to a subject who has suffered a stroke/brain injury. In this non-limiting example, the subject is encouraged to play the game of "Simon says" in order to treat hemispatial neglect. For this example, the "Simon" of the game may be a real person whose actions the user could view; alternatively the "Simon" may be an avatar, generated by the AR system and overlaid onto the viewed real physical environment.

Stages 1-3 of FIG. 9B may optionally be performed for this method as well, and optionally, only stage 3 of FIG. 9B is performed, so that the user enters the AR environment.

At stage 4, the user views the "Simon" of the game, which is optionally another player (such as a therapist) or alternatively is a non-player character (NPC) generated by the AR system. Preferably the user perceives the Simon as standing in front of him or her, and as facing the user. The user is preferably able to see his/her own body parts through the headset, or alternatively may optionally view an avatar as described above.

At stage 5, the Simon initiates an action, which the user is to mimic with the user's own body. The action of the Simon may optionally include grasping a virtual object overlaid over the real physical environment for example, although optionally any action may be performed by the Simon. In stage 6, the user copies—or at least attempts to copy—the action of the Simon. The user can see the Simon, as well as those parts of the user's body that are expected to be visible according to the position of the user's head and body.

Optionally, for stage 6, a representation of the user's body, as an avatar, may also be placed in front of the user, for example next to the Simon. The user could then see both the Simon, whose visual action(s) the user copies, and how the user's body is actually performing those actions with the user's avatar.

At stage 7, if the user fails to correctly copy the action of the Simon, the Simon preferably repeats the action. This process may optionally continue for a predetermined period of rounds or until the user achieves at least one therapeutic goal.

In stage 8, the ability of the user to perform such actions may be scored.

Figure 11:
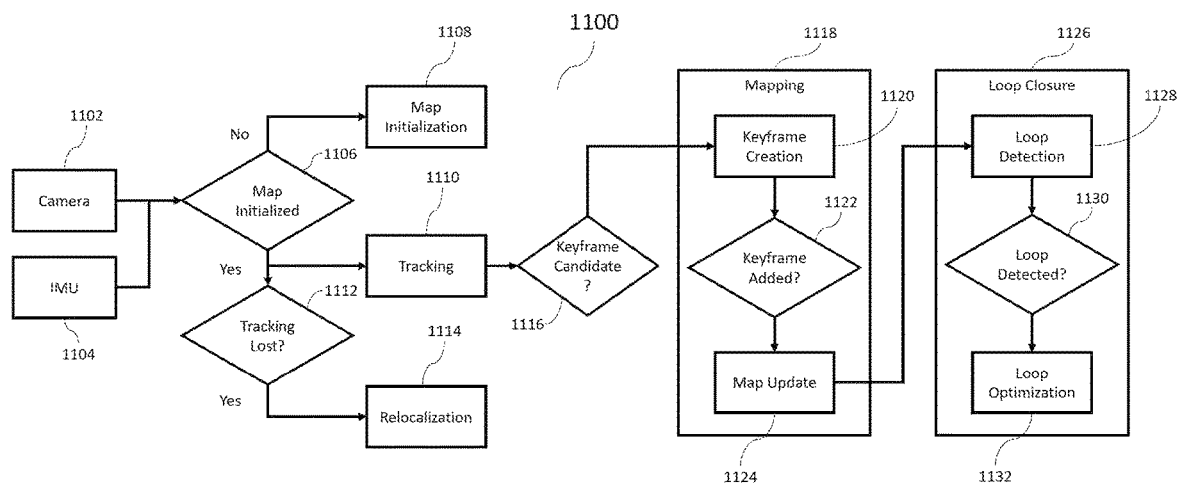
FIG. 11 shows an exemplary, non-limiting flow diagram for performing SLAM according to at least some embodiments.

FIG. 11 shows an exemplary, non-limiting flow diagram for performing SLAM according to at least some embodiments. As shown, a SLAM process 1100 begins with inputs from at least one sensor, shown in this non-limiting example as a camera 1102 and an IMU (inertial measurement unit) 1104. Camera 1102 is preferably an optical camera which may optionally be monocular.

Data from camera 1102 and IMU 1104 are then passed to a map initialization checking process 1106 which determines whether the map has been initialized. If not, the data is passed to a map initialization process 1108. Otherwise, the data is passed to a tracking process 1110. A tracking checking process 1112 determines whether tracking has been lost. If tracking has been lost, then the data is sent to a relocalization process 1114, and then back to tracking process 1110.

Tracking process 1110 then preferably performs tracking as follows. The pose is predicted, optionally by integrating IMU data between the previous time that the pose was known and the predicted time. Next a local map is optionally selected. For example, such a local map may optionally be constructed dynamically, based on the predicted pose, by making a list of potentially visible map points.

The local map is then tracked, for example with NCC (Normalized Cross Correlation), LK (Lucas-Kanade), or a combination thereof. For NCC, a patch is warped around a keyframe feature and compared to the current frame, in the area that the selected feature is expected to be present. LK involves tracking a feature from the previous frame to the next frame, which reduces or eliminates jittering.

Next, the image data (frame) is analyzed to determine whether it is a keyframe candidate by a keyframe analyzer process 1116. If so, then the frame is passed to a mapping process 1118, which begins with a keyframe creation process 1120. Once the keyframe has been created, a process 1122 adds the keyframe to the map. The keyframe is added by inserting the keyframe into the graph and updating the neighbor pointers. Once the keyframe has been added, a map update process is run in 1124.

After the map has been updated, a loop closure process 1126 is optionally run. As shown, loop closure process 1126 starts with a loop detection process 1128, to see whether a loop has been detected. Next, if a loop is detected in 1130, a loop optimization process 1132 is performed.

Optionally the process of FIG. 11 is implemented as follows, with regard to the three modules of tracking, mapping and loop closing. Each of the modules is optionally run in a separate thread. Communication between them is optionally performed using messages. This means that idle thread waits for a message to process it. If there is no message waiting, it falls asleep.

Figure 12A:
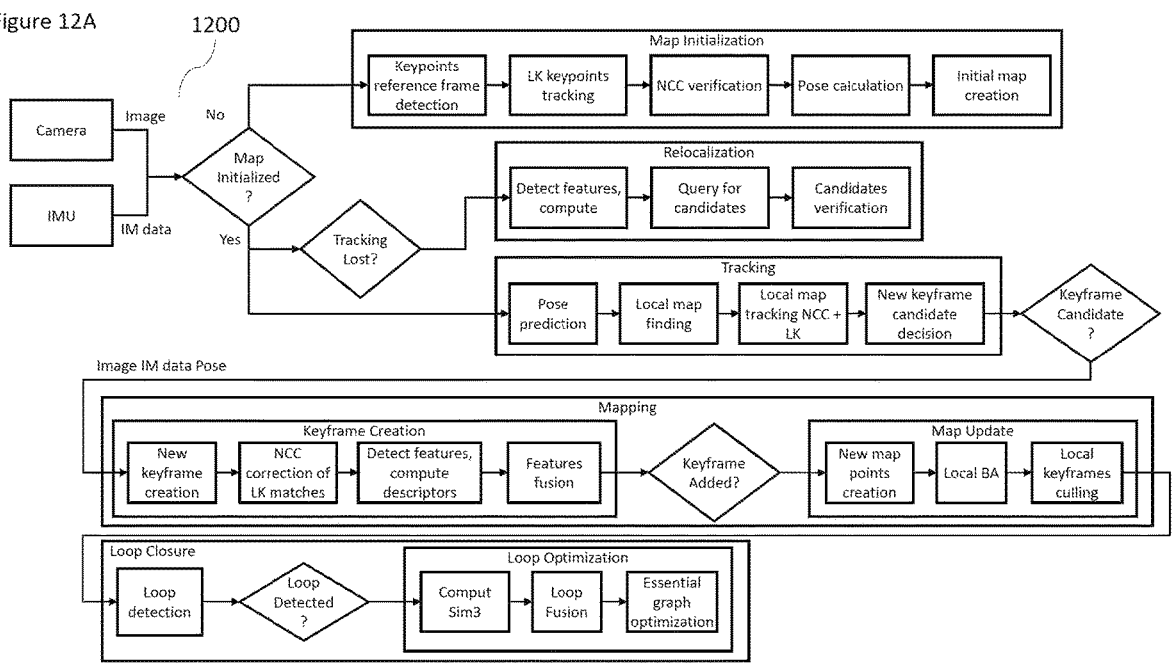
Figure 12B:
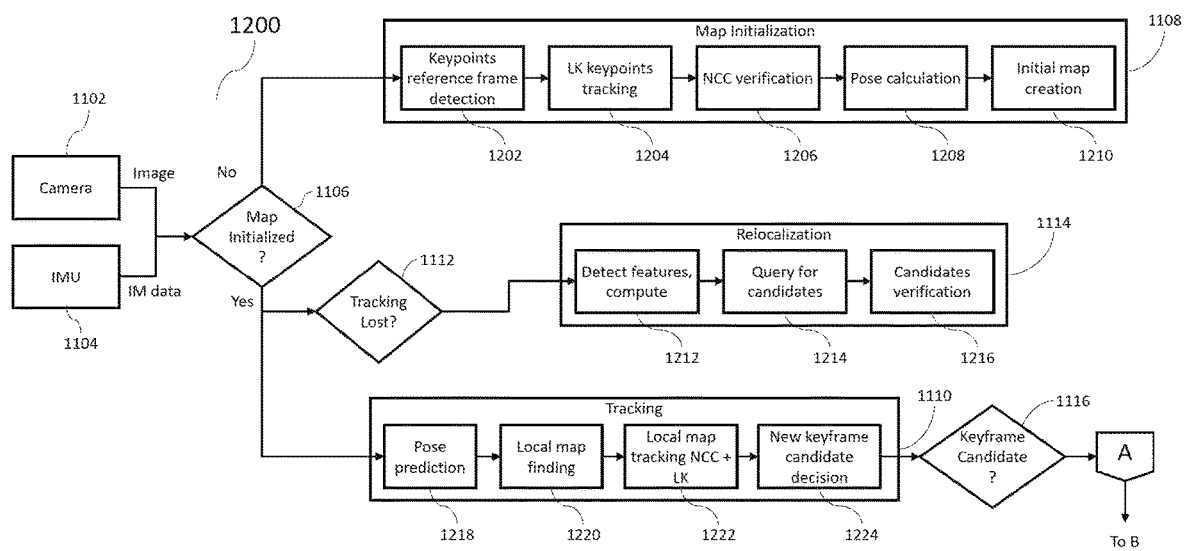
Figure 12C:
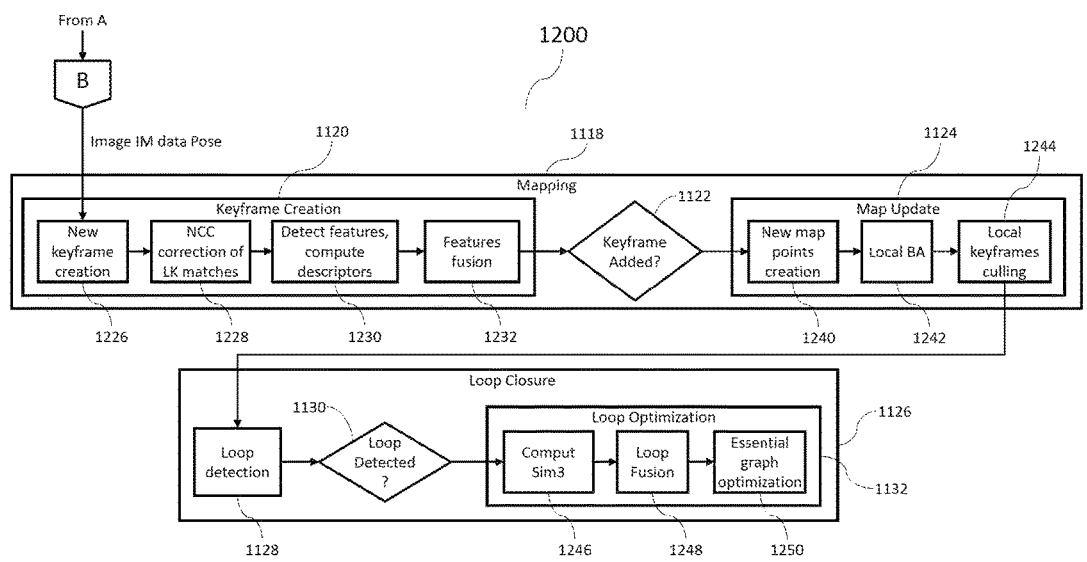

FIGS. 12A-12C show a detailed, exemplary, non-limiting flow diagram for performing SLAM according to at least some embodiments. FIG. 12A shows the overall diagram of a system 1200, while FIGS. 12B and 12C show two portions of the overall diagram. The below explanation is provided with regard to these latter two diagrams for the sake of clarity. Numbers that are identical to those of FIG. 11 have the same or similar function.

FIG. 12B shows the top portion of FIG. 12A. As shown, map initialization 1108 features a keypoints reference frame detection process 1202 to select the 1st frame as reference frame. A process 1204 includes detecting the points on the reference frame, for example by using the LK process as previously described.

Next, in process 1206, NCC is optionally used to verify the validity of the tracked points.

The NCC verified matches are optionally passed to an essential matrix RANSAC process or a homography RANSAC process to calculate the pose, in process 1208. An initial map is created in a process 1210.

As previously described, if tracking is lost, then relocalization process 1114 is optionally performed. A process 1212 detects features and computes descriptors. Next a process 1214 queries the inverted index for candidates. A process 1216 verifies geometry of the candidates.

If the map has been initialized and tracking has not been lost, then tracking process 1110 is performed, including pose prediction 1218. Next, a local map is determined in a process 1220. Local map tracking is then performed, optionally with a process 1222 that features NCC and LK. Then it is determined whether a frame is optionally a new keyframe in a process 1224. In some preferred embodiments, the fast mapping processor discussed above can be used to create new map points while tracking process 1110 is performed. In some cases, tracking process 1110 can detect that using the same or a subset of the same sensor data. For example, the optical sensor can move to an unknown or lesser-known portion of the map and the fast mapping processor can determine feature descriptors and use them as map points for tracking. During the mapping process described below, the new feature descriptors can serve as input for updating the map. In this way, both tracking and mapping can continue with less latency for the tracking. This same type of low-latency mapping can be performed during relocalization process 1114 as well. In some embodiments, this low-latency mapping does not include bundle adjustment to ensure lower latency. The flow then continues in FIG. 12C, if a new keyframe candidate is detected.

FIG. 12C shows the bottom portion of FIG. 12A. As shown in keyframe creation 1120, optionally various processes are performed to increase the efficacy of the method. These processes include finding the position within a keyframe using tracking based on normalized cross-correlation (NCC) between pixel patches. When the camera starts to observe the keypoints coming from outside of the map, a new set of keypoints needs to be computed (detected and described). Once this is done, the relationship is established between the newly computed keypoints and those that were tracked using NCC. To that end, the track trajectory is used to link the newly detected keypoints with those detected & tracked before.

In order to speed up this process, optionally a simplified version of a quadtree is used, for example and without limitation a SearchGrid2d. This is a structure to find the nearest neighbors in the image space in an efficient way through grid search confined to a search area in the neighborhood.

Once a full list of descriptors (the tracked ones and the newly detected ones) has been established, one can proceed to build a new keyframe from the whole set of descriptors, as shown in a process 1226.

Next, preferably a process 1228 to use NCC to correct LK matches is performed. LK matches are prone to drift. Performing a NCC search is not computationally expensive and can be used to refine the match.

Next a process 1230 to detect features and compute descriptors is performed. Then a process 1232 to fuse features is performed, preferably including removing duplicates, for example by using a quad-tree or similar.

Process 1122 checks that process 1120 succeeds in adding a new keyframe, after which the new keyframe proceeds to map update 1124.

As shown with regard to map update 1124, there is provided a new map points creation module 1240, which uses the new descriptors to add to the existing map. A local BA (bundle adjustment) process 1242 is performed. BA process 1242 relates to adjustment of the bundles of light rays originating from each 3D feature and converging on each camera's optical center. Adjustment is preferably performed with regard to structural and viewing parameters. Optionally one or more local keyframes are removed if they are redundant or otherwise not necessary in a process 1244.

Optionally, a process may be applied to determine whether there is sufficient parallax between two keyframes, to determine whether both keyframes are to be kept, for example as part of initialization 1200 (before process 1202) or as part of process 1240. Optionally different processes for determining parallax may be performed as part of initialization 1200 or process 1240.

FIG. 12D shows an exemplary, non-limiting flow diagram for calculating parallax sufficiency according to at least some embodiments. The process is described with regard to a plurality of points and may optionally also be used to determine sufficient parallax for two images, by comparing a large enough number of points to determine whether the images have enough parallax to be useful.

As shown in a process 1250, the process begins with receiving two images and a map with three dimensional points in stage 1252. A point from the first image is projected to the 3D map in stage 1254. The first image point is then transformed with the essential matrix, to locate an image point on the second image, in stage 1256. The essential matrix may be calculated as described in greater detail below. The second image point is then projected onto the 3D map in stage 1258. Two rays are then determined, a first ray from the first image point onto its corresponding point on the 3D map, and a second ray from the second image point onto its corresponding point on the 3D map. These rays are triangulated in stage 1260.

In stage 1262, it is determined whether there is sufficient parallax between the rays. Sufficient parallax means that there is a sufficiently large angle between the rays, determined according to a threshold. The threshold may be, for example, from 1 to 5 degrees (absolute value). Factors that affect sufficiency of parallax include but are not limited to the camera lens focal length and pixel density.

If there is not sufficient parallax, then in stage 1264A, at least one image point of the pair of points is rejected. If there is sufficient parallax, then in stage 1264B, the image points are accepted.

Turning back to FIG. 12, and specifically to FIG. 12C, loop closure process 1126, within loop optimization 1132, features computing a similarity transformation capturing the loop closing error in a process 1246. Preferably this similarity transformation is a SIM3 transformation. Sim3 is a similarity transform in 3D: 3 DoF for translation, 3DoF for rotation, and 1 DoF for scale. With loop closure, there are two solutions to locate the current camera position with respect to the map. These two solutions should be a single one, but, due to drift, they will diverge. Loop closing brings them back together. Next loop fusion 1248 is performed as previously described. Optionally, essential graph optimization is performed in a process 1250, if the keyframes are organized within a graph with pointers, to reduce the computational resources required.

Figure 13A:
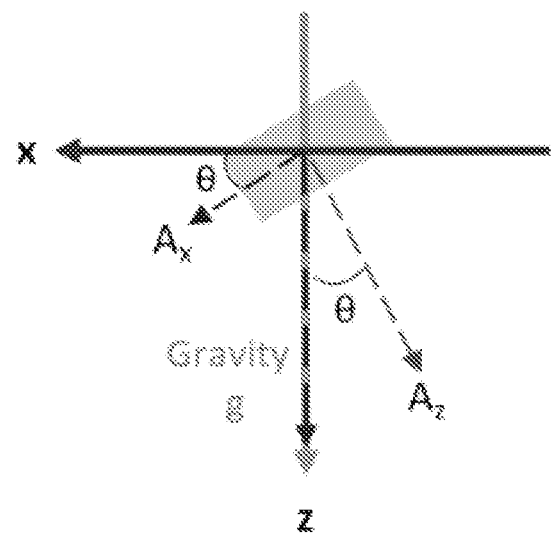
FIG. 13A shows a schematic graph of accelerometer data.

FIG. 13A shows a schematic graph of accelerometer data. For any rotation around the z-axis, the gravity vector keeps aligned with the axis, therefore providing no extra information. On top of that, in the presence of accelerations different from the gravity, the angle measurement cannot be achieved by only using accelerometer since the measure acceleration will no longer be 1 g. Therefore, another source of information is required to find the exact orientation of the accelerometer to be able to remove gravitational source of acceleration from the component due to the accelerometer's movement. In order to obtain the acceleration purely due to the movement, the accelerometer reading should be rotated to the global frame of reading where we can see the effect of gravity.

The gyroscope is a sensor which measures the angular velocity of the body to which it is attached (by using the Coriolis Effect). It is possible to determine rotation matrix from a single integration of gyroscope's signal. Nonetheless, this integration introduces error in the orientation due to the existence of time variant bias on gyroscope's signal.

A magnetometer is a device capable of measuring the magnetic fields across each one of the axes of the device. In the absence of any major electromagnetic interference, the magnetic field detected by this sensor is the one coming from the earth magnetic field, which makes the magnetometer read the heading angle with respect to the magnetic north as a global reference of orientation; An important aspect about using a magnetometer, however, is its vulnerability in the presence of additional sources of electromagnetic sources, which can distort significantly the sensor's reading.

So, to improve the orientation estimation, an approach is to fuse the orientation calculated from the gyroscope with tilt estimation from accelerometer and azimuth estimation from magnetometer using an optimal estimator such as Kalman filter. The position can be obtained by a double integration of the acceleration in the global frame of navigation. However, drift occurs very quickly with (double) integration of accelerometer signals (seconds) and relatively quickly with (single) integration of gyros (minutes).

Although the IMU is prone to drift and to issues regarding the initial calibration, it does have a number of strengths that can counterbalance weaknesses of optical SLAM. For example and without limitation, the high frequency of operation (400 Hz for example), operates without regard to external illumination conditions and provides reliable tracking in short-timespan.

Some optional uses for integrating the IMU data include finding the map scale and the gravity axis in the SLAM coordinate system (necessary to use accelerometer data) and dead reckoning via IMU when visual SLAM may not be accurate.

Map scale may optionally be recovered as follows. The SLAM system provides 3D position p_s(t) and orientation R_s(t) as functions of time t. From that, it is possible to compute the accelerations of the camera a s(t) by numerically deriving twice p_s with respect to t.

Assuming the IMU device and the camera sensor are placed at the same point, the SLAM data is related to the measured acceleration by accelerometer, a_i(t), as follows:

$$a_i(t)=R_s(t)*(s*a_s(t)+g)$$

where g is the gravity vector expressed in m/s² in the SLAM world coordinate system, and s the map scale.

By recording SLAM and IMU data during a correctly tracked motion that contains acceleration, it is possible to recover g and s.

It is possible to estimate position with IMU (dead reckoning) as follows. Assume that visual SLAM tracking is accurate until time t, after which it ceases to be accurate. It is necessary to estimate position at t+d.

Rotation estimation is estimated at the last known position: A(t)=R(t)

Then one can recursively integrate rotation:

$$A(t+dt)=A(t)\cdot\exp m(G(t)*dt)$$

$$A(t+dt):=A(t)\cdot\exp m(G(t)*dt)$$

where G(t) is a skew-symmetric matrix of gyro readings and dt is sampling period.

Then it is possible to initialize position and velocity estimates:

$$e(t)=p_s(t)$$

$$v(t)=(p_s(t)-p_s(t-dt))/dt$$

The following can then be updated:

$$v(t+dt)=v(t)+a_i(t+dt)*dt$$

$$p(t+dt)=p(t)+v(t)*dt+0.5*a_i(t+dt)\times dt^2$$

$$v(t+dt):=v(t)+a\_i(t+dt)*dt$$

$$p(t+dt):=p(t)+v(t)*dt+0.5*a\_i(t+dt)*dt^2$$

Figure 13B:
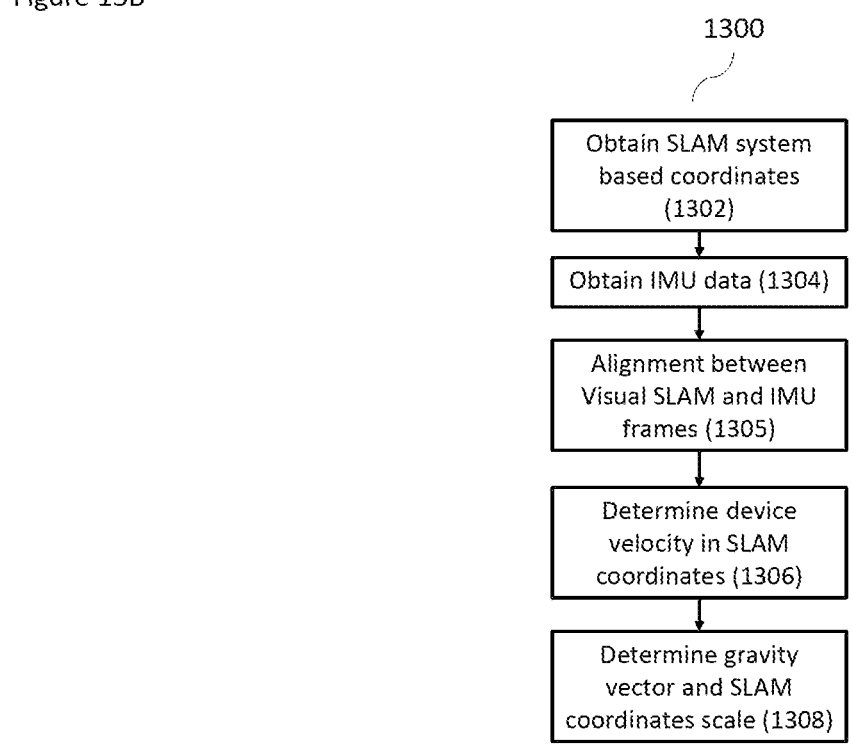
FIG. 13B shows an exemplary, non-limiting flow diagram for determining the coordinates scale and gravity vector from IMU (Inertial Measurement Unit) data according to at least some embodiments.

FIG. 13B shows an exemplary, non-limiting flow diagram for determining the coordinates scale and gravity vector from IMU data according to at least some embodiments.

Monocular SLAM can only reconstruct the geometry of a scene up to a scale factor. The unit of the SLAM coordinate system is arbitrary depending on how SLAM selects the unit when constructing the initial map. Since the IMU data provides device acceleration readings in metric units, it is possible to recover the scale of the SLAM coordinate system by comparing acceleration readings and accelerations computed from the SLAM camera trajectory. Since accelerometers also sense earth gravitation, the gravity vector in the SLAM coordinate system can also be evaluated.

As shown in a method 1300, the process starts with obtaining SLAM based coordinates for the current location of the apparatus (device), in stage 1302. These coordinates determine a device position Pt and device orientation Rt in the SLAM coordinate system. Next the IMU data is obtained in stage 1304, which provides accelerations aIMU with gravity component gIMU in IMU coordinate system in metric units. In the SLAM coordinate system, the linear acceleration of the device measured by the IMU is:

$$a_t = R_t \cdot (a_{IMU} - G_{IMU})$$
$$= R_t \cdot a_{IMU} - R_t \cdot g_{IMU}$$
$$= R_t \cdot a_{IMU} - g$$

in which, g is the gravity vector which is fixed in the SLAM coordinate system.

Let s be the scaling factor of the SLAM unit compared to the metric unit.

The device linear acceleration in SLAM unit is:

$$a_t = s \cdot (R_t \cdot a_{IMU} - g)$$
$$= s \cdot R_t \cdot a_{IMU} - g^*$$

in which g*=s·g in the fixed gravity vector in SLAM coordinate system. Let v(t) be the velocity of the device in SLAM coordinate system. It can be computed from finite differences of visual SLAM trajectory in stage 1306. It is then possible to write the position of the device at time t as:

$$P_t = P_{t_0} + \int_{t_0}^{t} v(t')dt'$$

$$= P_{t_0} + v_{t_0}(t-t_0) - \tfrac{1}{2}g^*(t-t_0)^2 + s \cdot C(t)$$

in which $$C(t) = \int_{t_0}^{t} [\int_{t_0}^{t'} R(t'') \cdot a(t'') dt''] dt'$$

which can be computed numerically by double integration. The term C(t) relates to integration of the gyroscope data. For the above equation, R(t+dt)=R(t)*exp(G(t)*dt), where G(t) is a skew-symmetric matrix of gyroscope readings and dt is sampling period.

For each t, there exists a linear equation with scale and gravity as variables.

$$\left[ -\tfrac{1}{2}(t-t_0)^2 \cdot I_{3\times 3} \;\bigg|\; C(t) \right] \cdot \begin{bmatrix} g^* \\ s \end{bmatrix} = P_t - P_{t_0} - v_{t_0}(t-t_0)$$

which can be solved according to the above as a series of linear equations according to least squares. Solving the equations for enough (t0, t) periods in the least square sense leads to the determination of the gravity vector and the scale which relates the SLAM coordinates to the metric measurements of the IMU.

The reference coordinate frame of slam GSLAM is different from that of IM, represented by GIMU. If the matrix that rotates data from frame A to frame B is shown by $R_A^B$, then to align the frame of SLAM with that of IMU:

$$R_{GIMU}^{GSLAM} = R_{cam}^{GSLAM} \times R_{IMU}^{cam} \times R_{GIMU}^{IMU}$$

Where $R_{cam}^{GSLAM}$ is the result of visual SLAM process and $R_{GIMU}^{IMU}$ is output of orientation tracking using IMU. Therefore, the two constant calibration matrices $R_{IMU}^{cam}$ and $R_{GIMU}^{GLAM}$, could be obtained during a constrained optimization process at stage 1305.

Figure 13C:
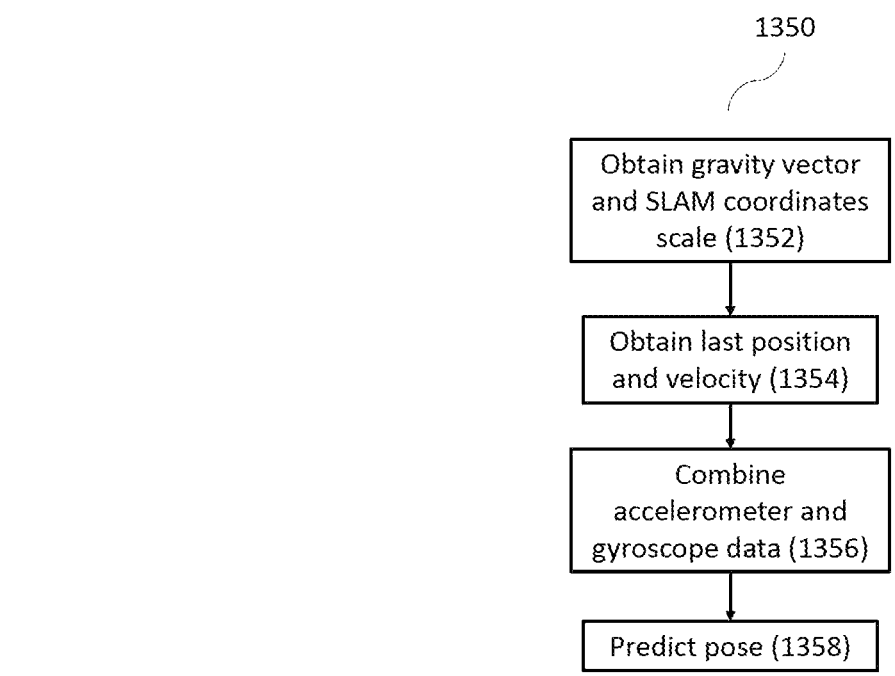
FIG. 13C shows an exemplary, non-limiting flow diagram for pose prediction according to at least some embodiments.

FIG. 13C shows an exemplary, non-limiting flow diagram for pose prediction according to at least some embodiments. Pose prediction is described for example with regard to process 1218 of FIGS. 12A-12C. As shown in a process 1350, the process begins with obtaining the gravity vector and SLAM coordinates scale in stage 1352, for example as described with regard to FIG. 13B. In stage 1354, the position and velocity of the device at the last successfully tracked position are provided. In stage 1356, accelerometer and gyroscope data are combined with the position and velocity of the device. Accelerometer data is combined through a double integration while accelerometer data is combined through integration to the desired time for prediction t. In stage 1358, pose prediction is performed according to the following equation, for determining Pt:

$$P_t = P_{t_0} + v_{t_0}(t-t_0) - \tfrac{1}{2}g^*(t-t_0)^2 + s \cdot C(t)$$

Figure 14:
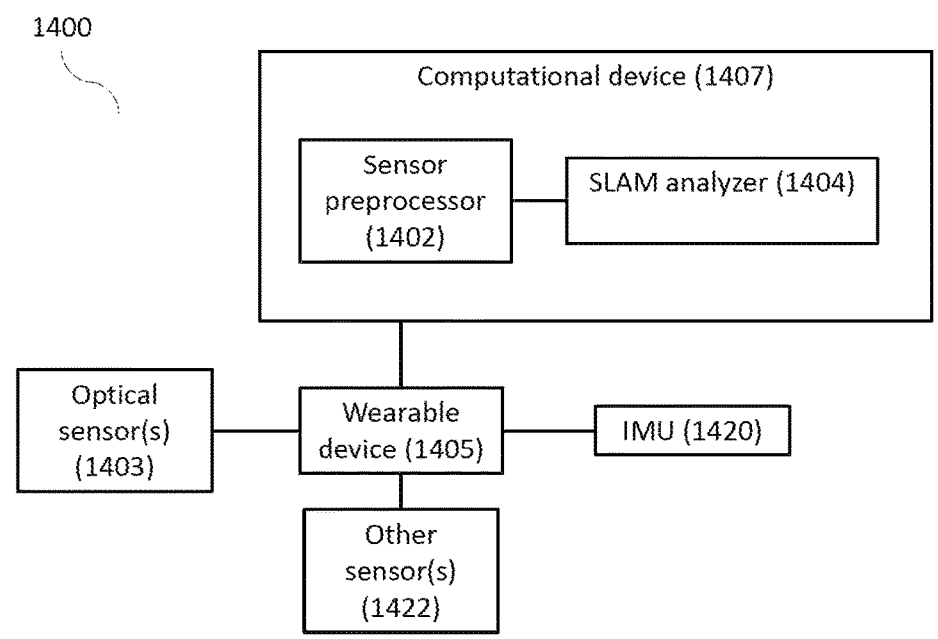
FIG. 14 shows an exemplary, non-limiting system for visual-inertial SLAM with IMU (inertial measurement unit) data according to at least some embodiments.

FIG. 14 shows a schematic block diagram of an exemplary, non-limiting system for visual-inertial SLAM with IMU (inertial measurement unit) data according to at least some embodiments. In some implementations, SLAM system 1400 can include at least one computational device/computer 1407 (as indicated earlier, the terms/phrases of computer, processor and computation device can be used interchangeably in the present disclosure), a wearable device 1405, one or more optical sensors 1403, one or more IMU 1420 and optionally one or more other sensor(s) 1422. Optionally, at least one optical sensor 1403 and at least one IMU 1420 can be combined in a single device (not shown).

The computational device 1407 can include a sensor preprocessor 1402 and a SLAM analyzer 1404, and can be operatively coupled to the wearable device 1405 (e.g., wired or wirelessly), and can be included in the wearable device 1405, and/or some combination thereof. Sensor preprocessor 1402 and SLAM analyzer 1404 can be separate processors in and of themselves in the computational device, or, may be software modules (e.g., an application program and/or a set of computer instructions for performing SLAM functionality operational on one or more processors). In some implementations, the computational device 1407 can be configured to receive signal data (e.g., from the wearable device 1405), to preprocess the signal data, so as to determine movement of the wearable device 1405, and to instruct the wearable device 1405 to perform one or more actions based on the movement of the wearable device 1405. Specifically, in some implementations, sensor preprocessor 1402 can receive the optical sensor data and the IMU data from the wearable device 1405, and can perform preprocessing on the data. For example, sensor preprocessor 1402 can generate abstracted optical sensor and IMU data based on the optical sensor and IMU sensor data.

SLAM analyzer 1404 is configured to operate a SLAM process so as to determine a location of wearable device 1405 within a computational device-generated map, as well as being configured to determine a map of the environment surrounding wearable device 1405. For example, the SLAM process can be used to translate movement of the user's head and/or body when wearing the wearable device (e.g., on the user's head or body). A wearable that is worn on the user's head would for example provide movement information with regard to turning the head from side to side, or up and down, and/or moving the body in a variety of different ways. The wearable may be attached to a robot or other moving object. Such movement information is needed for SLAM to be performed.

In some implementations, because the preprocessed sensor data is abstracted from the specific sensors as described above, the SLAM analyzer 1404, therefore, may be sensor-agnostic, and may perform various actions without knowledge of the particular sensors from which the sensor data was derived.

As a non-limiting example, if optical sensor 1403 is a camera (e.g., digital camera including a resolution, for example, of 640×480 and greater, at any frame rate including, for example 60 fps), then movement information may be determined by SLAM analyzer 104 according to a plurality of images from the camera. For such an example, sensor preprocessor 1402 preprocesses the images before SLAM analyzer 1404 performed the analysis (which may include, for example, converting images to grayscale). Next a Gaussian pyramid may be computed for one or more images, which is also known as a MIPMAP (multum in parvo map), in which the pyramid starts with a full resolution image, and the image is operated on multiple times, such that each time, the image is half the size and half the resolution of the previous operation. SLAM analyzer 1404 may perform a wide variety of different variations on the SLAM process, including one or more of, but not limited to, PTAM (Parallel Tracking and Mapping), as described for example in "Parallel Tracking and Mapping on a Camera Phone" by Klein and Murray, 2009 (available from ieeexplore.ieee.org/document/5336495/); DSO (Direct Sparse Odometry), as described for example in "Direct Sparse Odometry" by Engel et al, 2016 (available from https://arxiv.org/abs/1607.02565); or any other suitable SLAM method, including those as described herein.

In some implementations, the wearable device 1405 can be operatively coupled to the one or more optical sensor(s) 1403, the one or more IMU 1420 and the one or more other sensor(s) 1422 to the computational device 1407 (e.g., wired, wirelessly). The wearable device 1405 can be a device (such as an augmented reality (AR) and/or virtual reality (VR) headset, and/or the like) configured to receive sensor data, so as to track a user's movement when the user is wearing the wearable device 1405. The wearable device 1405 can be configured to send sensor data from the one or more optical sensor(s) 1403, the one or more IMU 1420 and the one or more other sensor(s) 1422 to the computational device 1407, such that the computational device 1407 can process the sensor data to identify and/or contextualize the detected user movement.

In some implementations, any or a combination of the one or more optical sensors 1403, the one or more IMU 1420 and the one or more other sensor(s) 1422 can be included in wearable device 1405 and/or separate from wearable device 1405.

Optical sensor 1403 can be a camera, for example as one or more of an RGB, color, grayscale or infrared camera, a charged coupled device (CCD), a CMOS sensor, a depth sensor, and/or the like. Other sensor(s) 1422 may include one or more of an accelerometer, a gyroscope, a magnetometer, a barometric pressure sensor, a GPS (global positioning system) sensor, a microphone or other audio sensor, a proximity sensor, a temperature sensor, a UV (ultraviolet light) sensor, and/or other sensors. IMU 1420 can be an accelerometer, a gyroscope, a magnetometer, a combination of two or more of same, and/or the like. IMU 1420 preferably comprises an accelerometer and a gyroscope, and optionally and preferably further comprises a magnetometer.

As described in greater detail below, the IMU data and optical data is preferably combined by the SLAM process performed by SLAM analyzer 1404. Various methods are known in the art for such a combination, but the combining process is time-based, as the IMU data provides measurements with regard to time.

Figure 15A:
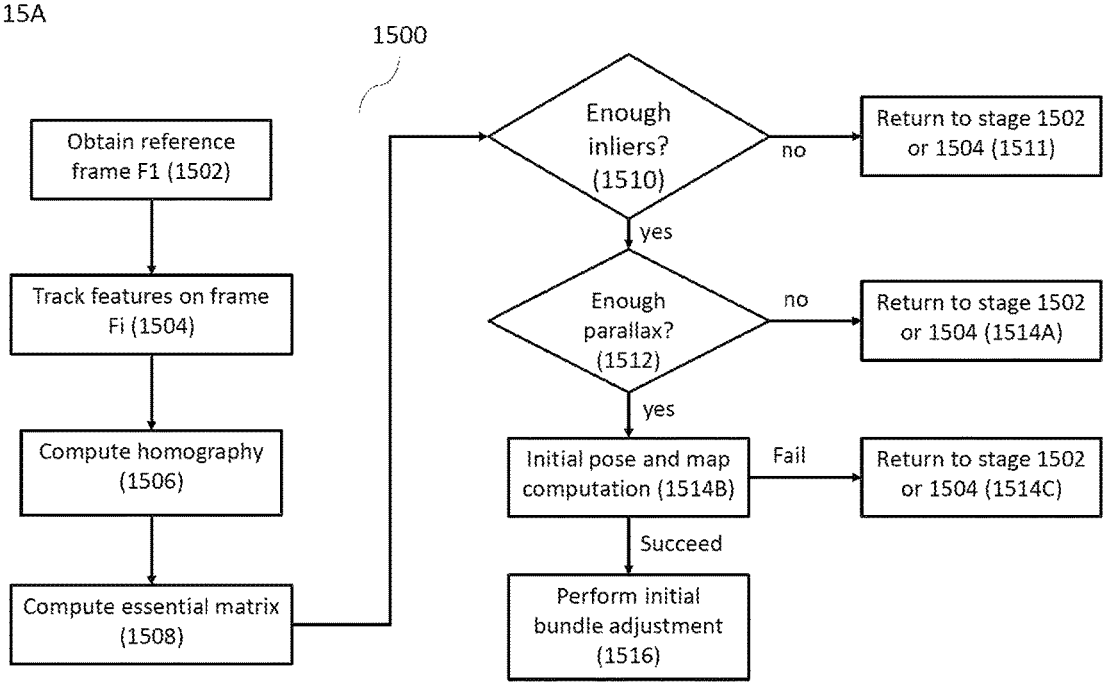
FIG. 15A shows an exemplary, non-limiting flow diagram for SLAM initialization according to at least some embodiments.

FIG. 15A shows an exemplary, non-limiting flow diagram for SLAM initialization according to at least some embodiments. As shown, a method 1500 begins with obtaining a reference frame F1 in stage 1502. Next, features are tracked in an incoming frame Fi in stage 1504. The features are analyzed to determine whether a current frame Fi can be used as a second reference frame, optionally in two stages as shown. In stage 1506, homography relating features on F1 and Fi are computed. In stage 1508, essential matrix relating features on F1 and Fi are computed. Stages 1506 and 1508 may be performed in any order or in parallel. Homography provides better results for planar or two dimensional scenes (such as a wall for example) than an essential matrix. An essential matrix is operative for any three dimensional scene.

Homography is a mapping of two images of the same planar surface. Homography is also applicable to two projection planes having the same center of projection. The previously described RANSAC algorithm can estimate homography and determine inliers at the same time. Homography may be used to determine inliers by determining whether two points represent the same feature on two images, by transforming a point on one image to locate the point on a second image with homography. Also the inverse is performed to take a point on the second image to locate it on the first image. The distances between the various pairs of points are then summed; if the difference is too great, then at least one point is an outlier. A similar method may be used for application of an essential matrix. These methods may be performed according to the ORB SLAM paper (Mur-Artai et al, "ORB-SLAM: A Versatile and Accurate Monocular SLAM System", IEEE Transactions on Robotics (Volume: 31, Issue: 5, October 2015), pages 1147-1163.

An essential matrix is applicable to stereo scenes. In a three-dimensional scene, corresponding points lie on conjugate epipolar lines. Given a point in one image, multiplying by the essential matrix will determine which epipolar line to search along in the second view. The essential matrix can be estimated through various algorithms, including without limitation GOODSAC and RANSAC (Michaelsen et al, "ESTIMATING THE ESSENTIAL MATRIX: GOODSAC VERSUS RANSAC", Photogrammetric Computer Vision (2006), pp. 1-6).

Optionally, homography is computed first and if the result is sufficiently robust, stage 1508 (computation with the essential matrix) is skipped. Alternatively, both stages 1506 and 1508 are applied, and then the best result is selected for subsequent stages. The process then determines whether there are enough inliers of points in the image, as determined with regard to the map points, in stage 1510. The determination of whether there are sufficient inliers relates to a threshold, which may optionally be set heuristically. It is then determined whether the distance is within a threshold distance. The threshold distance may be determined heuristically and may for example be up to 10 pixels, up to 5 pixels, up to 1 pixel or any distance in between. If the distance is within the threshold, then the first image point is included as an inlier. Otherwise it is rejected as an outlier.

If there aren't sufficient inliers, the process preferably returns to stage 1504 or may return to stage 1502, for reasons described in greater detail below (1511). If there are sufficient inliers, the process preferably continues to stage 1512 to determine whether there are enough inliers with enough parallax. A detailed description of a non-limiting, exemplary method for determining whether there is enough parallax is provided with regard to FIG. 12D.

If stage 1510 fails, the process continues to stage 1511. If stage 1512 fails, the process continues to stage 1514A. Each of stage 1511 or stage 1514A returns the process to stage 1504; if more than a threshold number of failures have occurred, stage 1514A returns the process to stage 1502.

In stage 1514B, initial pose and map computation is performed. If the initial pose and map are successfully determined, the process continues to stage 1516. Otherwise, the process continues to stage 1514C, which returns the process to stage 1504; if more than a threshold number of failures have occurred, stage 1514C returns the process to stage 1502.

In stage 1516, an initial bundle adjustment is performed. According to some embodiments, the initial bundle adjustment is performed with two frames F1 and Fi, and a 3D map point, as described for example with regard to FIG. 4.

According to some embodiments, the initial bundle adjustment is performed with optical and IMU data according to a time-based method, such as a spline camera trajectory, for example. A detailed description of a non-limiting example of such a method is provided with regard to FIG.

15B. Briefly, the method operates by determining a relative position of the camera in both space and time, with 6DOF (degrees of freedom). The motion of the camera is parameterized and then preferably interpolated with a spline, for example by using quaternion interpolation. It is possible to calculate six unknowns for the 6DOF or alternatively, to analyze data points that are captured relatively closely together, so that only the differences between the parameters need to be determined. The spline also assists in reducing the number of unknowns to be calculated, as it can be used to interpolate the data between control points of the spline. A non-limiting example of a method for performing such a spline-based parameterization is described by Lovegrove et al (Spline Fusion: A continuous-time representation for visual-inertial fusion with application to rolling shutter cameras, Proc. BMVC, 2013).

Preferably, for better results, projected coordinates of matches along the spline are determined for each frame, to determine whether the tracking is operating sufficiently well such that predicted matches have similar coordinates to actual matches. The accelerometer data is assumed to match the camera acceleration, as the two sensors are part of the same hardware unit and/or are otherwise physically connected to be traveling at the same speed. Similarly, the gyroscope data is assumed to match the camera rotation speed. These assumptions reduce the complexity of calculations.

Also if a spline camera trajectory method is used, the coordinates of the features from frame Fi in stage 1504 are preferably stored in RAM.

The same or a similar process may be used in initialization of the map, such as for example process 1210 of FIGS. 12A-12C, or bundle adjustment such as for example process 1242 of FIGS. 12A-12C. When used for initialization of the map, a basic set of control points for the spline is preferably available, whether from a previous mapping process or from another source.

FIG. 15B shows an exemplary, non-limiting flow diagram for calculating a spline camera trajectory according to at least some embodiments. A process 1550 begins with receiving tracked trajectories of features, initial geometry and IMU data points, in stage 1552. The optical data is preferably parameterized as described above, for example by using homography and/or the essential matrix. The IMU data preferably includes at least gyroscope and accelerometer data. A plurality of control points is determined, for example according to a plurality of time points. The time points may be determined according to elapsed time for example. Next the spline control points are initialized according to a linear interpolation of the initial geometry, in stage 1554. The data analysis seeks to minimize errors when determining the location (position and orientation) of the point of the spline in three dimensional space. Each control point represents a control moment and features a key frame, but not all key frames are necessarily associated with control moments.

The data analysis then preferably proceeds with a loop, in which the error is minimized. The loop includes evaluating the objective function in stage 1556 and then refining the control points and the map points, in stage 1558, for example according to an algorithm such as Levenberg-Marquardt or Gauss-Newton. The process then loops back to stage 1556 for minimizing the error. These two stages are preferably repeated until a minimum error is achieved. Minimizing error preferably includes minimizing the reprojection error (of the map points along the feature trajectories), the gyroscope error and the accelerometer error.

The spline may also be used for pose prediction; once the spline has been determined as described above, and data from the inertial tracking system is received (preferably including gyroscope and accelerometer data), it is possible to predict the pose at the next time point according to a combination of the spline and the data.

In some embodiments, a differential equation solution can be used in place of a spline-based approach as described above for calculating a trajectory. In some embodiments, a combination of the two types of solutions can be used.

Figure 16:
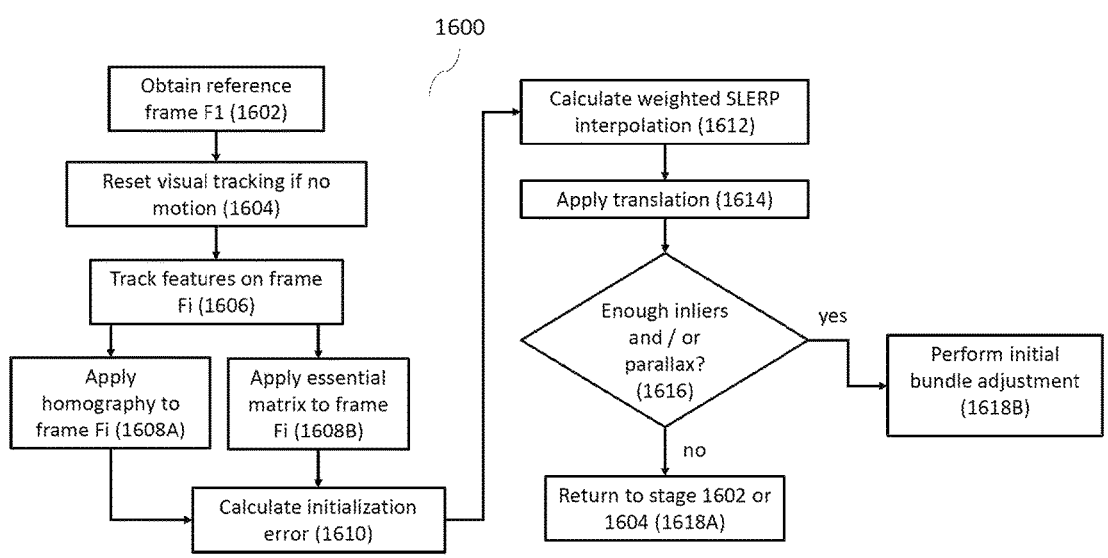
FIG. 16 shows an exemplary, non-limiting flow diagram for SLAM initialization with interpolation of IMU data according to at least some embodiments.

FIG. 16 shows an exemplary, non-limiting flow diagram for SLAM initialization with interpolation of inertial tracking data according to at least some embodiments. As shown, a method 1600 begins with obtaining a reference frame F1 in stage 1602. Next, visual tracking is optionally reset if there is no motion (that is, no change from a previous image) in stage 1604. Features are tracked in an incoming frame Fi in stage 1606. The features are analyzed to determine whether a current frame Fi can be used as a second reference frame, optionally in a plurality of stages as shown.

In stage 1608A, homography is computed while in stage 1608B, an essential matrix is computed. These stages may optionally be performed as previously described.

Next initialization errors for inertial tracking and visual tracking are calculated in stage 1610.

A weighted SLERP (spherical linear interpolation) of the IMU rotation and the rotation as calculated from homography (stage 1608A) and/or essential matrix (stage 1608B) is then performed in stage 1612. The weight for this interpolation depends upon the initialization error. This interpolation may be used to correct any errors occurring from analysis of the optical data. A SLERP is a method which allows to interpolate two rotations represented as quaternions and may be performed according to any suitable method.

A non-limiting example of a method to calculate SLERP may be found in the SOPHUS library, found in the GitHub repository as follows: https://github.com/strasdat/Sophus. This library uses Lie groups to parameterize a rotation according to three values so that a minimizer can handle it efficiently. Certain Lie groups represent transformations in two dimensional and three dimensional space, including with regard to cases involving transformations of rotations in three dimensional space, such as those represented by the above rotations. They can be applied according to the associated Lie algebra, to calculate a SLERP interpolation.

Another non-limiting example of a method to calculate SLERP may be found in the Mobile Robot Programming Toolkit (https://www.mrpt.org/turorials/programming/maths-and-geometry/slerp-interploation/).

In stage 1614, the results determined from translation of inertial tracking are optionally applied. However, the translation of inertial tracking may not be accurate to use as a measurement because of a relatively long time window required during initialization. Optionally, translation from inertial tracking is used to validate results calculated by visual tracking if initialization is corrupted. Alternatively stage 1614 is not performed.

The process then determines whether there are enough inliers of points in the image, as determined with regard to the map points, and/or parallax in stage 1616. This determination is performed by computations using homography and/or the essential matrix, optionally after application of the results of stages 1610 and 1612, or stages 1610-1614. Non-limiting, exemplary methods for performing such determinations were previously described.

If there are not sufficient inliers and/or parallax, the process continues to stage 1618A, which returns the process to stage 1604. If more than a certain number of failures have occurred or the number of inliers has dropped below a defined threshold, stage 1618A returns the process to stage 1602.

If there are sufficient inliers and/or parallax, then in stage 1618B, an initial bundle adjustment is performed with two frames F1 and Fi, and a 3D map point, as described for example with regard to FIG. 4.

Figure 17B:
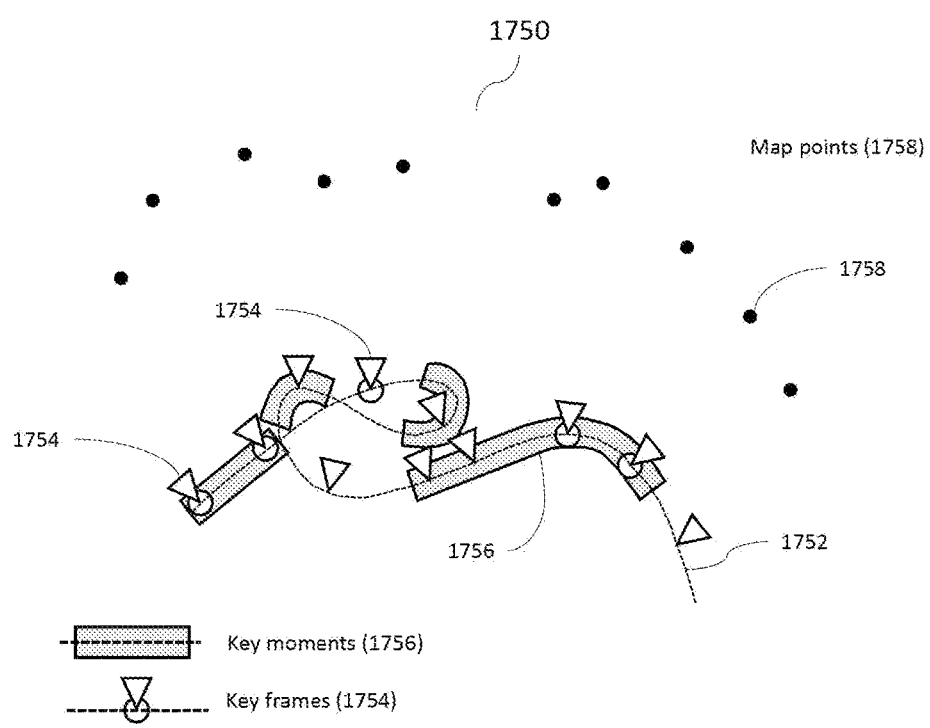
FIG. 17B shows an exemplary, non-limiting schematic diagram of a spline with a plurality of key moments and key frames.

FIG. 17A shows an exemplary, non-limiting flow diagram for determining a key moment according to at least some embodiments. An explanation of key moments is provided with regard to FIG. 17B below.

As shown in FIG. 17A, a process 1700 begins with providing a tracker in stage 1702, such as for example tracking module 1110. The tracker maintains a buffer, shown as tracking buffer 1730, which is preferably continuously refreshed as a circular buffer with tracking data. The tracking data includes but is not limited to one or more of map point ID, image frame timestamp and the 2D coordinates at which the map point has been observed.

A separate IMU buffer 1732 is preferably continuously refreshed as a circular buffer with IMU data. The IMU data includes but is not limited to one or more of a timestamp, gyroscope data, accelerometer data and optionally magnetometer data.

Next, in stage 1704, after tracking initialization or recovery, the last_key_moment parameter is initialized to be equal to the frame_timestamp parameter (that is, the timestamp of the last tracked frame). For each incoming frame in stages 1706 and 1708, the frame is tracked in stage 1706. According to the results of tracking in stage 1706, tracking buffer 1730 is then updated.

Next a keyframe decision is made as to whether the frame is to be selected as a keyframe, for example as described in the ORB SLAM paper or as described with regard to FIG. 12 above, in stage 1708. If the decision is to accept the frame as a keyframe, then a key moment is defined as described with regard to stage 1710. The key moment is defined as starting at: MAX(current_frame_timestamp−k, last_key_moment) and ending at current frame timestamp (inclusive). The constant "k" is determined empirically, typically in seconds, such as for example 1 second or any other suitable value. In stage 1712, data from the tracking buffer 1730 and the IMU buffer 1732 between starting and ending time are copied to the Key Moment.

Next in stage 1714, the last key moment is set to be parameter equal to the current_frame_timestamp. In stage 1716, the key moment is sent to the mapping module. Optionally, stages 1714 and 1716 are performed in parallel or in either order. The process then returns to stage 1706 for the next frame.

FIG. 17B shows an exemplary, non-limiting schematic diagram of a spline with a plurality of key moments and key frames. As shown, diagram 1750 features a spline 1752 for tracking motion of the optical sensor through a plurality of map points 1758. Spline 1752 is determined according to a plurality of key frames 1754 and key moments 1756. As noted above, in a visual SLAM system, the problem of computational resources is handled by selecting a sparse subset of the frames, called key frames. For a visual-inertial SLAM system, the complete time window from when the camera acquisition started to the present time is not considered. Instead, only a sparse partition of this time is considered, keeping only "key moments".

Preferably key moments 1756 cover the geometry of spline 1752.

Key moments 1756 also preferably cover when the device is accelerated, to capture scale. Key moments preferably cover "links" between previously mapped areas and newly discovered areas, so that IMU data relates new map points to old ones. Static moments (with no movement) are preferably discarded. Dynamic moments over an already mapped area may be discarded if scale of this area has been estimated reliably already.

Any and all references to publications or other documents, including but not limited to, patents, patent applications, articles, webpages, books, etc., presented in the present application, are herein incorporated by reference in their entirety.

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and apparatuses which may further include any and all elements from any other disclosed methods, systems, and apparatuses, including any and all elements corresponding to target particle separation, focusing/concentration. In other words, elements from one or another disclosed embodiments may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

The invention claimed is:

1. An apparatus, comprising: a wearable device;
an optical sensor coupled to the wearable device;
a computational device;
a simultaneous localization and mapping (SLAM) analyzer configured to operate on the computational device and to receive optical sensor data from said optical sensor and having a localization processor and a fast mapping processor, the fast mapping processor configured to rapidly create a map from said optical sensor data; and
a map refinement processor to refine said map according to said optical sensor data; wherein said localization processor is configured to localize the optical sensor according to said optical sensor data within said map according to a SLAM process; and wherein at least two of said localization processor, said fast mapping processor, and said map refinement processor is configured to operate at a separate process speed of said computational device;
wherein said SLAM analyzer is configured to operate said map refinement processor at a first process speed and to operate said fast mapping processor at a second process speed, said first process speed being substantially slower than said second process speed; wherein said localization processor comprises a tracking processor and at least one of said SLAM analyzer and localization processor is configured to operate said tracking processor at a third process speed, said third process speed being different from said first process speed and different from said second process speed and being substantially faster than said second process speed; and said tracking processor is configured to localize said optical sensor on said map according to said optical sensor data and according to a last known position of said optical sensor on said map; and wherein said tracking processor is configured to reduce jitter by spreading error across localizations.

2. The apparatus of claim 1, wherein said computational device comprises a mobile computational device.

3. The apparatus of claim 2, wherein said computational device comprises a cellular phone.

4. The apparatus of claim 3, wherein said wearable device comprises headgear for mounting said wearable device to a user, said cellular phone comprises said optical sensor, and said cellular phone is mounted on said headgear or is otherwise connected to it.

5. The apparatus of claim 1, wherein said first process speed is at least 50% slower than said second process speed.

6. The apparatus of claim 1, wherein said third process speed is at least five times faster than said second process speed.

7. The apparatus of claim 1, wherein said map refinement processor is configured to calibrate said optical sensor according to an estimate of difference between said map before and after said map refinement processor refines said map.

8. The apparatus of claim 1, wherein: said SLAM analyzer further comprises a map changes processor, and said map changes processor is configured to detect a change in the environment of said optical sensor represented by said map.

9. The apparatus of claim 8, further comprising an outside application configured to be operated by said computational device for manipulating, locating or representing an object, wherein said map changes processor is configured to send a message signal to said outside application that: a particular object has been moved, a particular object has disappeared from its last known location, or a new specific object has appeared.

10. The apparatus of claim 9, wherein said outside application comprises a VR (virtual reality) application or an AR (augmented reality) application.

11. The apparatus of claim 10, wherein:
said outside application is an AR application;
said SLAM analyzer further comprising a real object locator; and
said real object locator determines a location and geometry of a physical object in an environment external to the apparatus, and provides said location and geometry to said AR application.

12. A method for performing SLAM for an apparatus comprising a wearable device, a sensor attached to the wearable device, a computational device, and a simultaneous localization and mapping (SLAM) analyzer operated by the computational device, the method comprising:
receiving sensor data from said sensor by said SLAM analyzer;
performing a SLAM process by said SLAM analyzer, said SLAM process comprising:
simultaneously dynamically constructing a map and locating the wearable device according to said sensor data within said dynamically constructed map, wherein said SLAM process is adapted to be performed by said limited resources of said computational device;
performing a fast mapping process to rapidly create said dynamically constructed map from said sensor data;
performing a localization process to localize said wearable device in said dynamically constructed map according to said sensor data; and
performing a map refinement process to refine said dynamically constructed map according to said sensor data,
wherein:
said map refinement processor is operated at a first process speed of said computational device and said fast mapping processor is operated at a second process speed of said computational device, said first process speed being substantially slower than said second process speed so as to adapt said SLAM process to be performed by said computational device;
wherein said SLAM analyzer is configured to operate said map refinement processor at a first process speed and to operate said fast mapping processor at a second process speed, said first process speed being substantially slower than said second process speed; wherein
said localization process comprises a tracking process and wherein said localization process is configured to operate said tracking process at a third process speed, said third process speed being different from said first process speed and different from said second process speed and being substantially faster than said second process speed; and
said tracking process is configured to localize said optical sensor on said map according to said optical sensor data and according to a last known position of said optical sensor on said map; and
wherein said map refinement processor is configured to calibrate said optical sensor according to an estimate of difference between said map before and after said map refinement processor refines said map.

13. The method of claim 12 wherein said first process speed is at least 50% slower than said second process speed.

14. The method of claim 13, wherein said third process speed is at least five times faster than said second process speed.

15. An apparatus, comprising: a wearable device;
an optical sensor coupled to the wearable device;
a computational device;
a simultaneous localization and mapping (SLAM) analyzer configured to operate on the computational device and to receive optical sensor data from said optical sensor and having a localization processor and a fast mapping processor, the fast mapping processor configured to rapidly create a map from said optical sensor data; and
a map refinement processor to refine said map according to said optical sensor data; wherein said localization processor is configured to localize the optical sensor according to said optical sensor data within said map according to a SLAM process; and wherein at least two of said localization processor, said fast mapping processor, and said map refinement processor is configured to operate at a separate process speed of said computational device;

wherein said SLAM analyzer is configured to operate said map refinement processor at a first process speed and to operate said fast mapping processor at a second process speed, said first process speed being substantially slower than said second process speed; wherein said localization processor comprises a tracking processor and at least one of said SLAM analyzer and localization processor is configured to operate said tracking processor at a third process speed, said third process speed being different from said first process speed and different from said second process speed and being substantially faster than said second process speed; and said tracking processor is configured to localize said optical sensor on said map according to said optical sensor data and according to a last known position of said optical sensor on said map; and wherein said SLAM analyzer further comprises a map changes processor, and said map changes processor is configured to detect a change in the environment of said optical sensor represented by said map.

* * * * *